United States Patent [19]
Russell

[11] 3,895,721
[45] July 22, 1975

[54] INDEXING PANEL INSTALLER
[75] Inventor: Carl D. Russell, Tulsa, Okla.
[73] Assignee: Aquarius, Inc., Lawton, Okla.
[22] Filed: July 28, 1972
[21] Appl. No.: 274,136

Related U.S. Application Data
[63] Continuation-in-part of Ser. No. 94,100, Dec. 1, 1970, abandoned, and a continuation-in-part of Ser. No. 56,833, July 21, 1970.

[52] U.S. Cl. .................... 214/1 H; 52/749; 156/71; 214/1 D; 214/1 Q; 214/1 SW; 214/650; 214/730
[51] Int. Cl............................................ E04f 21/18
[58] Field of Search ...... 52/749, 121; 214/1 R, 1 Q, 214/1 H, 1 SW, 1 S, 1 D, 650, 651, 730, 750, 1 BB, 1 BT

[56] References Cited
UNITED STATES PATENTS

| | | | |
|---|---|---|---|
| 2,497,887 | 2/1950 | Hilpert............................ | 214/1 H X |
| 2,828,869 | 4/1958 | Corley............................. | 214/1 SW |
| 2,851,182 | 9/1958 | Gehring........................... | 214/730 |
| 2,859,884 | 11/1958 | Pearce............................. | 214/1 H |
| 2,928,556 | 3/1960 | White.............................. | 214/1 H |
| 3,361,280 | 1/1968 | Traver............................. | 214/1 SW X |
| 3,598,263 | 8/1971 | Ehmke............................ | 214/620 X |

Primary Examiner—Frank E. Werner
Attorney, Agent, or Firm—Wilfred G. Caldwell

[57] ABSTRACT

For construction purposes, there is provided a novel method and apparatus for orienting and securing one panel to a floor and/or to one or more panels of an array to comprise a wall, floor, ceiling or the like. The panel may be joined by contact adhesive along one longitudinal edge to the array or along two adjacent edges. In either event the apparatus insures fitting of the panel to the array prior to the application of adhesive, withdraws the panel from the array along a predetermined path to a predetermined location for application of the adhesive, then contacts the panel edges to the array to distribute adhesive along the edges to be bonded and removes the panel to the predetermined position until the adhesive reaches its optimum setting point. Then all points of the edges to be bonded are caused to contact simultaneously because the panel is moved along the predetermined path to its array position. One embodiment affixes panels in the vertical plane but brings them to the horizontal plane to facilitate the application of adhesive, and returns them for bonding without disturbing the final alignment. Modifications of this embodiment enable tilting, angling, and skewing of the panel relative to a fixed floor or platform supporting the base of the machine to insure coplanar indexed alignment of the panel to the array prior to bonding.

31 Claims, 45 Drawing Figures

PATENTED JUL 22 1975

SHEET 1

3,895,721

INVENTOR.
BY

PATENTED JUL 22 1975 3,895,721
SHEET 4
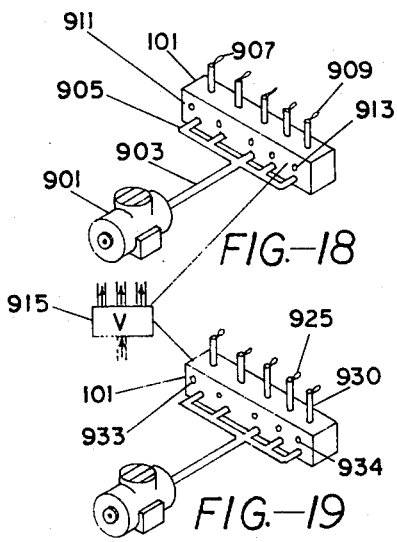
FIG.-18
FIG.-19
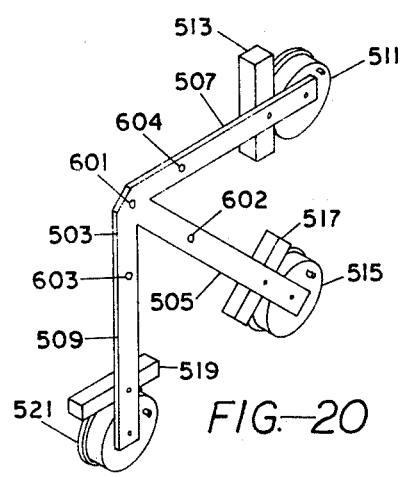
FIG.-20
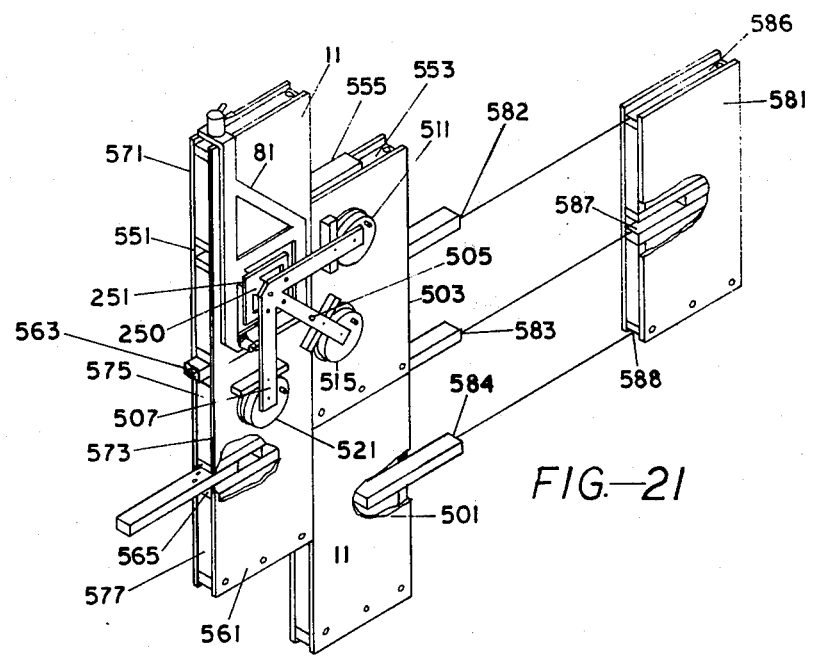
FIG.-21
INVENTOR.
BY PATENTED JUL 22 1975 3,895,721
SHEET 5
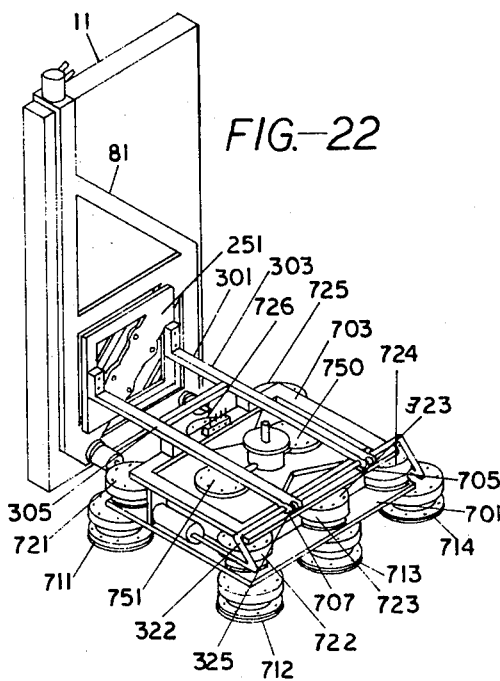
FIG.-22
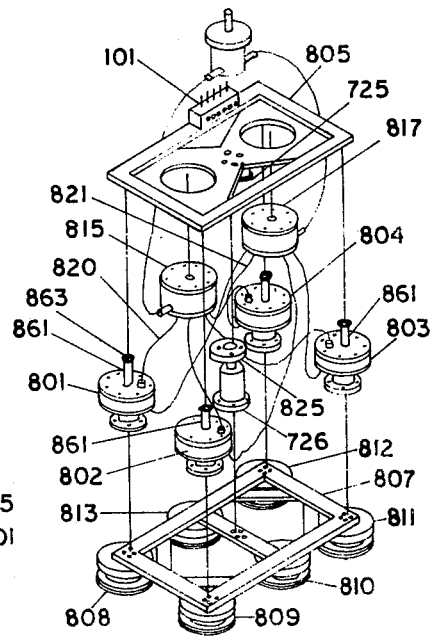
FIG.-23
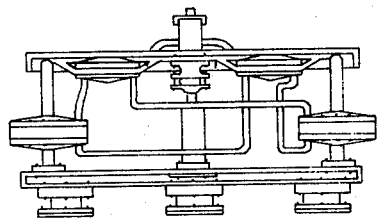
FIG.-24
FIG.-25
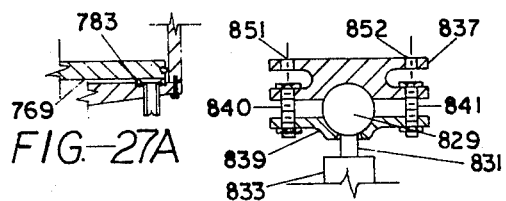
FIG.-27A    FIG.-26
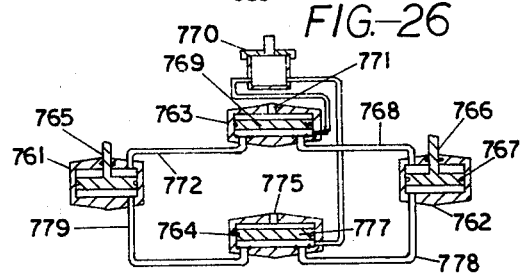
FIG.-27
INVENTOR.
Carl D. Russell
BY

PATENTED JUL 22 1975  3,895,721
SHEET 6

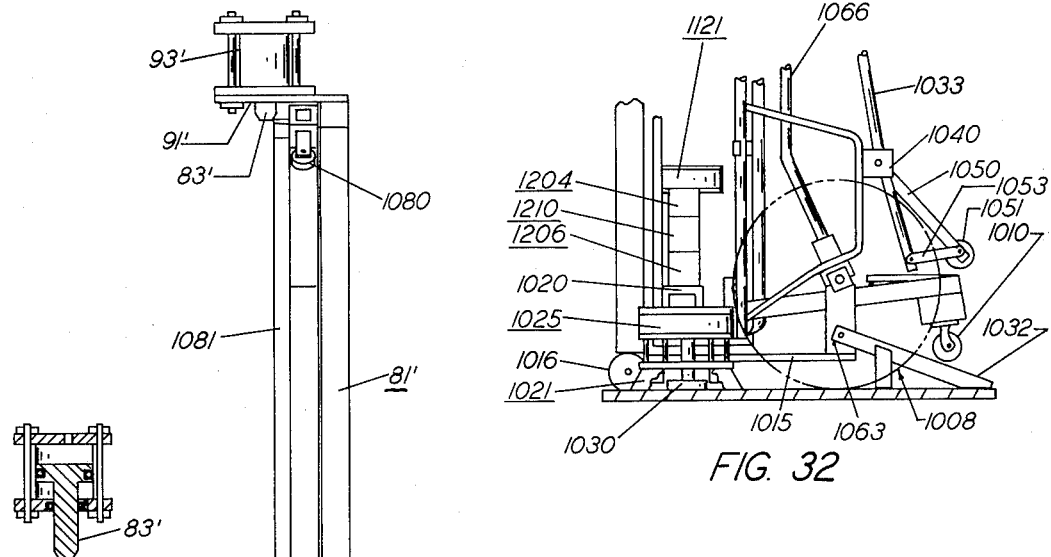
FIG. 32
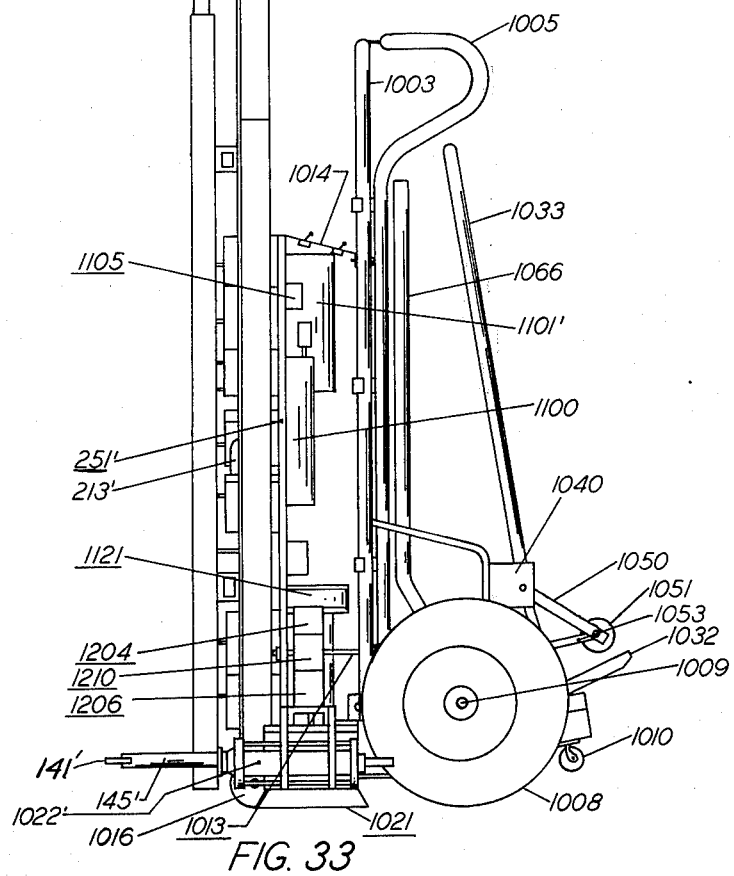
FIG. 34
FIG. 33

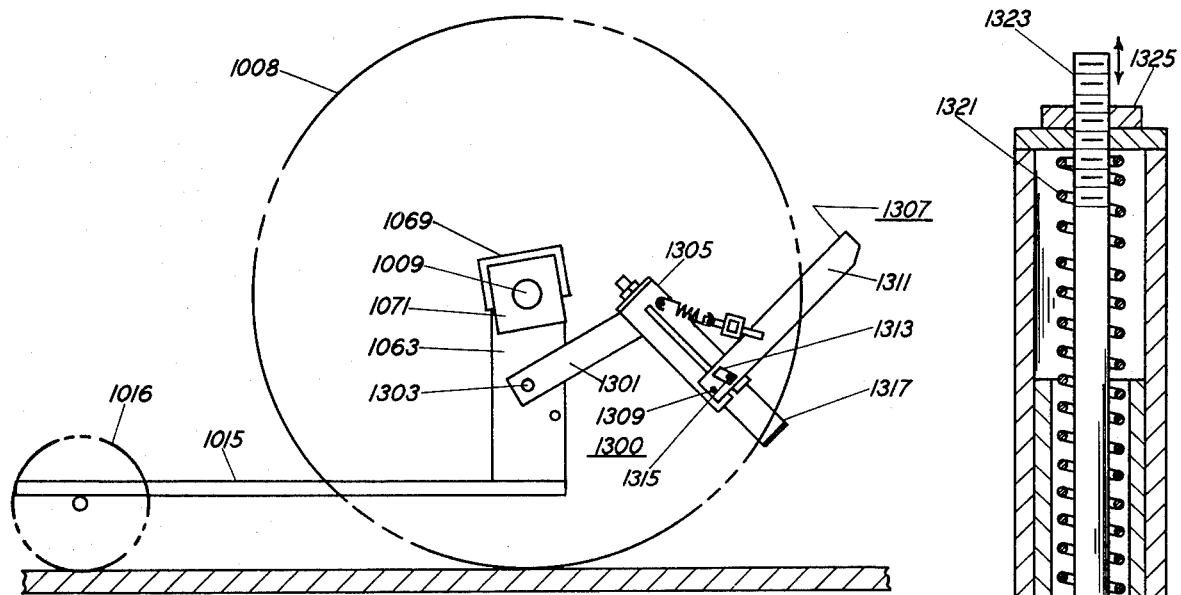
FIG. 42
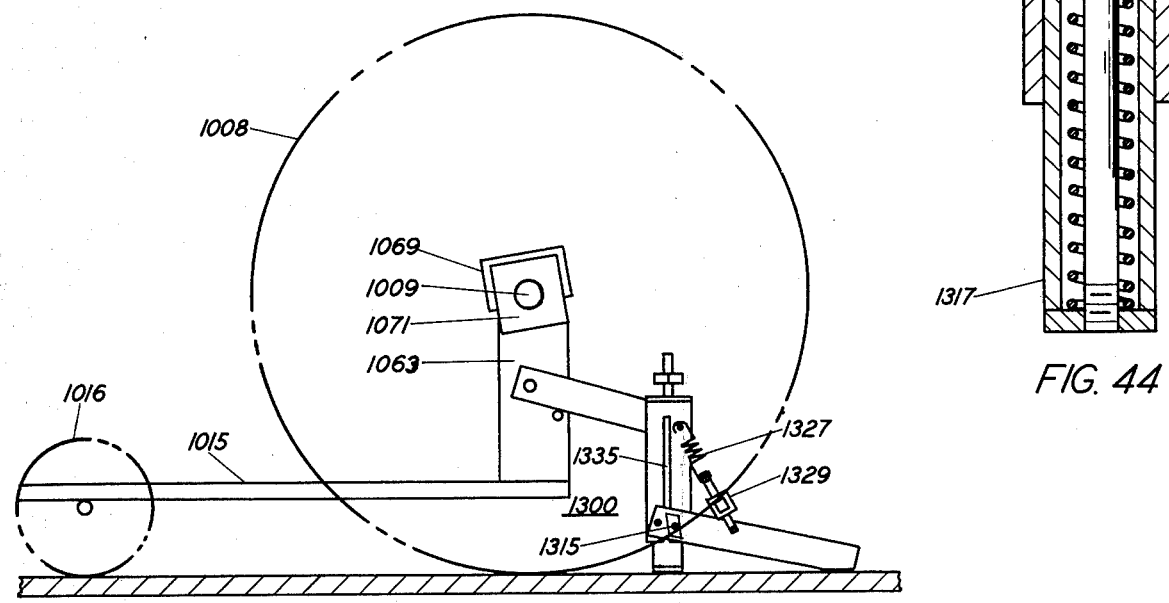
FIG. 43
FIG. 44

INDEXING PANEL INSTALLER

This application is a continuation-in-part of my earlier filed copending application, Ser. No. 94,100 now abandoned filed on Dec. 1, 1970 in turn a continuation-in-part of Ser. No. 56,833 now abandoned filed on July 21, 1970 and entitled the CDR Construction Panel Installer. U.S. Ser. No. 264,925 is a divisional application of U.S. Ser. No. 94,100.

The invention relates to novel methods and apparatus for orienting, aligning, and securing one panel to one or more panels in an array or to initiate the array of locating and securing a first panel. The array may comprise a partial wall of a building to which panels are added by longitudinal edge contact to complete the same, or it may comprise a roof, floor, or ceiling wherein panels are added by making exact contact along adjacent edges of one or more panels of the array.

In this manner, the method of the invention enables the construction of a dwelling, house, or other building or construction on the site, through the use of one of the embodiments of the apparatus herein described.

With the advent of modern, light-weight, but durable, construction materials, and substantially improved adhesive, it has now become possible to erect buildings employing modular units precision manufactured to predetermined dimensions at remote points and shipped to the site. Usually, the modular units are panels which have the same external dimensions, but the various panels may differ by incorporating openings therethrough or the like for windows, doors, air conditioning units, fans, etc. or they may include matching paneling, offset or inlaid coatings or decorative material.

One available commercial panel, suitable for use in modular construction, is comprised of a peripheral frame, such as a rectangle of 2 × 2's, having external dimensions of four feet in width by eight feet in height. Opposing facings, usually of plywood, sandwich insulation, such as polyurethane, within the 2 × 2 frame enclosure and close the same to comprise the construction panel. Such a panel may weigh 200 pounds or more.

These panels may be modified to serve as the building blocks for the present invention through the provision of precisely located and orientated apertures to enable predetermined engaging of each panel so that it may be handled in precisely the same manner as other panels in erecting the structure. Preferably, a pair of aligned apertures penetrates the panel through opposing facings and the frame adjacent to one edge, usually the bottom edge. A corresponding pair of apertures extend in parallel relation to one another (but in orthoginal relation to the first mentioned pair) penetrate the edge (e.g. top) opposite said adjacent edge to enable exact predetermined gripping of the panel by a panel frame holder through the use of reciprocating pins or grippers adapted for automatic release of the panel after it has been properly secured in position.

The panel frame holder is carried by a directional carriage or guideway which is provided to move the panel via the panel holder frame along a predetermined path for mating with one or more already placed panels. The mating may occur only along the longitudinal edges, as is possible in the construction of a wall one panel high, or it may occur along adjacent right angle edges, as in the construction of coplanar arrays exceeding one panel in dimension, i.e. two story walls, floors, roofs, ceilings or the like. In either event, the panel is brought into contact with the array along a predetermined path that does not move the panel parallel with the edges of the array to be contacted. Where right angle or parallel edges are involved, the predetermined path is 45°.

However, for other geometric shapes, such as equilateral triangles, the insertion of one triangle between adjacent triangles involves a predetermined path of 30°, along which the one triangle travels relative to the edges of the array already existing, and the principles herein disclosed will apply to the assembly of various other shapes and configurations in the same manner.

In the apparatus, the panel is held by the panel frame holder, in turn, adapted for movement along the predetermined path through the provision of the directional carriage or guideway means, which is preferably pivotally connected to a base securing means. The pivotal connection is desirable in order that panels making up a vertical wall may be pivoted into a horizontal position or plane so that adhesive may be applied easier along the edge or edges to be joined. Then the panel is pivoted back to its vertical position with the adhesive bearing edges spaced a predetermined distance from the edges to be contacted. Operation of driving means, such as a piston, for moving the panel holder frame relative to the directional carriage or guideway means then enables the panel lightly to contact the array and distribute adhesive to the array edges to be joined, the panel being quickly removed to its spaced predetermined position for a time interval to enable the adhesive to reach its optimum bonding point. Then, the driving means is again actuated to move the panel edge or edges into precise simultaneous contact with the edge or edges of the array to be joined, such that the panel is located in its proper position as the adhesived edges contact the array edges to bond, thereby avoiding misjoinder which would require cutting away of one or more panels, resulting in the destruction of the same.

The base securing means is equipped with vacuum cups for firmly securing, or attaching it to a surface in order that the predetermined path may be fixed relative to that surface. For example, if the machine is being used to lay a floor, the surface upon which it rests is ordinarily that portion of the floor already laid, and the same is true with the roof. However, if the machine is installing a wall, it is generally moved to progressive locations along the pre-existing floor or a platform along the wall being installed. Thus, the vacuum cups include pressure and vacuum lines, the pressure line serving to drive a piston against the floor for moving the machine. The piston thus includes a polished lower surface or a surface including one or more rollers. The vacuum cup includes an O-ring through which the piston extends or retracks. The vacuum connection insures that the vacuum suction between the cup with the O-ring area and the floor or other surface to which it is holding persist.

In further embodiments of the invention, an orientable base is included between the base securing means and the frame supporting means, which orientable base is carried by a universal pedestal for orientation into any position and locking in such position to insure that the panel handling frame will follow the correct predetermined path properly to locate the panel in its attachment or required coplanar position. Two or more valves may be used to control two or more locking and alignment pistons for tilting, angling, or rocking the orientable base, in turn to displace the frame supporting means, directional carriage and panel handling frame to insure proper positioning of the panel. In embodiments incorporating this feature, the orientable base is held in its desired orientation by vertical extensions of the locking and alignment pistons which are locked in the desired positions by their associated valves through pressure locks.

A further embodiment of the invention provides only for the laying of floors, ceilings and roofs. It accommodates panels specially designed for incorporating internal reinforcing, through studs adapted to extend into adjacent panels along guideways, to reinforce the array. It does not require the pivotal connection because the adhesive is applied when the panel is backed off to its predetermined location relative to the array, but the panel remains in the plane of the array. Thereafter, the panel is caused to travel along a predetermined path to be bonded to the array. However, the same type base securing means may be employed for directly supporting the directional carriage in turn carrying the panel handling frame.

A feature of the invention resides in the provision of remotely extendable locking devices for enabling the panel handling frames to grip the panel using the apertures therethrough. It opens angular locking fingers extended beyond the edges of the aperture with pressure being applied to cause the locking device to grip the panel adjacent edge (usually lower edge) through aperture. The locking device incorporates a second piston for driving the locking shaft through the hollow shaft to open the locking fingers on the reverse side of the panel. Thus, a pressure-vacuum system remotely locks and unlocks the machine to and from the panel.

With the foregoing in mind, the object of the invention is to provide a unique method and apparatus for handling panels in the construction of buildings or the like.

The foregoing will be explained in greater detail in the following description relating to the invention in its various embodiments taken in the light of the accompanying drawings wherein:

FIG. 18 shows a typical pressure pump and manifold assembly;

FIG. 19 shows a typical manifold pump and vacuum assembly;

FIG. 20 is a perspective view of the base securing portion of a different embodiment of the invention;

FIG. 21 shows the embodiment of the invention of FIG. 20 in operative relation to an array of panels being assembled as a floor or the like;

FIG. 22 is a view in perspective of a further embodiment of the invention incorporating an orientable base;

FIG. 23 is an exploded view of an assembly similar to that of FIG. 22 to illustrate the operating principle thereof;

FIG. 24 is a view in side elevation of the structure of FIG. 23;

FIG. 25 is a view of a portion of the structure of FIG. 23 in elevation;

FIG. 26 is a detailed view of the universal pedestal;

FIG. 27 is a view of the operating control arrangement for the structure of FIG. 23 and applicable to the structure of FIG. 22; and FIG. 27A is a detailed view of a portion of a locking valve.

FIG. 32 shows the same mechanism with the panel fitted and the stevedore handling apparatus locked in position for homing the panel to its final position;

FIG. 33 is a view of the handling mechanism in side elevation without the plywood panel;

FIG. 34 is a detailed sectional view of the piston cylinder for gripping the top of the plywood panel;

FIG. 42 shows a different stabilizing mechanism in its inoperative position;

FIG. 43 shows the stabilizing mechanism in its operative position; and

FIG. 44 is a detailed view of the sliding foot arrangement.

Figure 1:
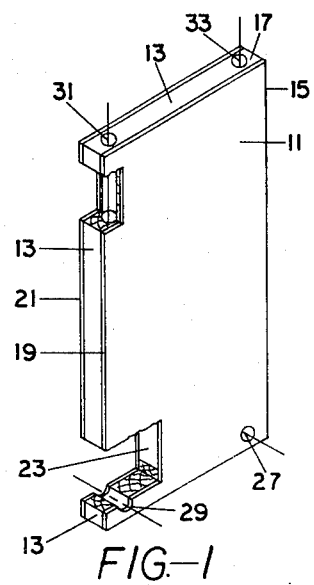
FIG. 1 is a view in perspective of a panel suitable for use in the present invention.

In FIG. 1, there is shown a panel 11 adapted for use in the present invention as a building block. The panel 11 is comprised of a peripheral frame 13 of solid members, such as 2 × 2's or larger or smaller dimensioned members, depending upon the overall panel dimensions. The usual building panel 11 measures eight feet along the height, shown as edge 15, and four feet along the top, shown as width edge 17.

A front plywood face 19 closes the frame 13 on the visible side of panel 11 in FIG. 1 and a reverse face plywood sheet 21 closes the rear side of frame 13. These plywood facing sheets usually vary in thickness from ⅛ to ¾ inches. The interior of frame 13 between opposing faces 19 and 21 is filled with foam 23, such as an expanded polyurethane foam, which provides excellent thermal characteristics and renders the dwelling vermin proof for the reason that the polyurethane foam is apparently poisonous to insects and further because the modular construction precludes cracks and crevaces otherwise found in conventional housing.

The panel 11 is then precisely apertured in predetermined positions to enable uniform gripping of the panels by the apparatus. Through apertures 27 and 29 penetrate the lower frame member 13' also, of course, passing through the outer faces 19 and 21 to comprise a pair of apertures extending in a plane normal to the plane of panel 11.

The top edge 17 receives apertures 31 and 33 extending within the plane of the panel 11 which is, of course, a plane orthogonal to the plane of the apertures 27 and 29. The apertures 31 and 33 also take advantage of the peripheral framing 13 and they are located to extend downwardly into the longitudinal framing members such as 13''.

Figure 2:
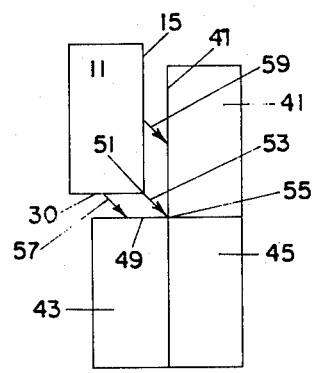
FIG. 2 is a schematic arrangement showing one panel in its predetermined position relative to an array of panels with the arrows indicating the predetermined path of travel for the one panel.

In FIG. 2, there is shown a panel 11, adapted to assemble the two panels 41 and 43 to array 45. Adhesive (not shown) is applied along the edges 15 and 30 of panel 11 and a portion of this adhesive is distributed to edge 47 of panel 41 and edge 49 of panel 43 by light contact with edges 15 and 30 of panel 11, panel 11 being withdrawn to its predetermined position, as shown in FIG. 2. After the adhesive has dried or set for a few minutes, to its optimum bonding condition, it will bond or contact, being a commercially available contact type adhesive. Thus, it is absolutely necessary that edges 15 and 47 register simultaneously with edges 30 and 49 properly at all points to assemble the panel to the array 45.

This is accomplished by causing panel 11 to follow a predetermined path having an orientation of 45° relative to edges 47 and 49. Thus, the lower right hand corner 51 of panel 11 follows the arrow path 53 to contact junction point 55 between edges 47 and 49. Similarly, edge 30 follows the 45° path indicated by arrow 57 to register with edge 49, and edge 15 follows the 45° arrow path 59 to register with edge 47. Thus, it may be seen that every point on panel 11 or the entire panel itself is guided along the 45° path to establish simultaneously the entire instant bonding contact.

Figure 3:
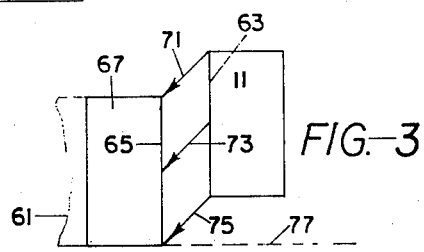
FIG. 3 is a similar view but showing one panel in its predetermined position relative to another panel comprising a portion of a wall with the predetermined path of travel also being indicated by the arrows.

In FIG. 3, there is shown a panel 11 adapted to be joined to an existing wall, represented at 61 by one or more panels. It will be noted that this time the panel 11 is brought from a different direction than panel 11 joining the array 41 of FIG. 2. Also, it is noted that a single edge 63 of panel 11 is to be joined to a single edge 65 of the wall panel 67. Panel 11 is in its predetermined position in which adhesive may be applied along edge 63 and the panel moved to contact edge 65 to distribute adhesive thereto, and then returned to the predetermined position, shown in FIG. 3. Alternatively, the panel 11 may be flipped from the predetermined position of FIG. 3 into a horizontal position, to facilitate the application of the adhesive, and then returned by the apparatus of the invention to the stated predetermined position for subsequent movement along the path indicated by arrows 71, 73 and 75 to permit simultaneous joining of the entire extent of edges 63 and 65. The previously built, or pre-existing floor is represented by the dashed line 77 and the panel 11 may also be glued to floor 77 or otherwise fixed thereto, as desired. For example, baseboards, troughs or channels may be provided to receive panel 11 and cover the lower apertures 27 and 29 (FIG. 1) to seal and enhance the decor or appearance.

Thus, while a pair of apertures 31 and 33 is provided in the top 17 of panel 11 (FIG. 1), it may be noted that one of these apertures may be employed in guiding the panel 11 in one direction, i.e. in the direction shown in FIG. 2, and the other aperture utilized in guiding the panel in an opposite direction, i.e. the panel direction followed in FIG. 3. Alternatively, both apertures may be employed if desired for either direction.

Figure 4:
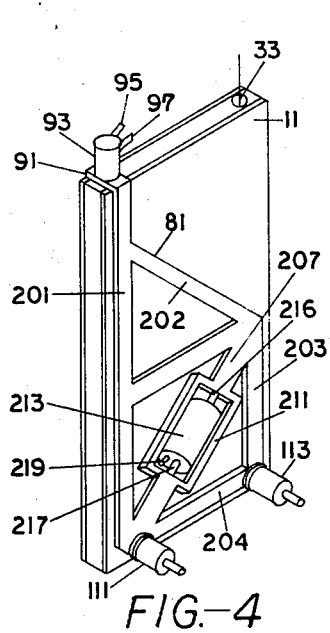
FIG. 4 is a view in perspective of the panel holder frame applied to a panel.

In FIG. 4, it will be noted that the panel 11 is gripped by the panel holding frame 81 through the use of all apertures except aperture 33, pin or plunger 83 (FIG. 5) of panel holding frame 81 being sungly fitted in aperture 31 (FIG. 1), lower pin 85 (FIG. 5) occupying aperture 27 and the other lower pin 87 fitting aperture 29.

Figure 5:
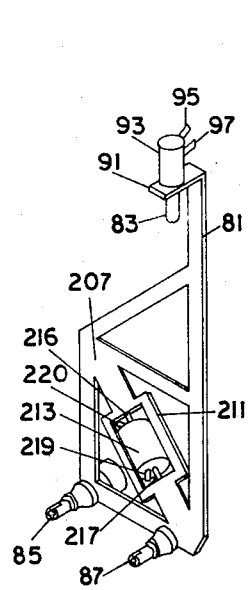
FIG. 5 shows the panel holder frame, per se, in perspective, from the reverse side thereof.
Figure 6:
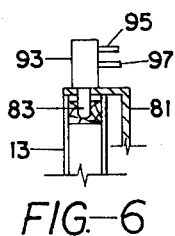
FIG. 6 is a cross-sectional detailed view showing one connection to the panel from the panel holding frame.
Figure 7:
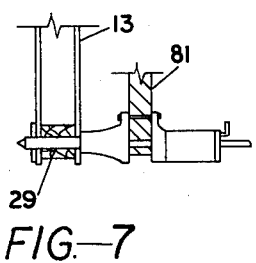
FIG. 7 is a cross-sectional detailed view showing another connection to the panel from the panel holding frame.

As is best seen in FIG. 5, the panel holder frame 81 includes an offset arm 91 extending generally normal to the plane of the panel holder frame to space the remainder of frame 81 away from panel 11. Arm 91 carries a piston cylinder 93 which operates the pin or plunger 83. Operation of the piston cylinder 93 is under control of an exhaust hose coupling 95 and a pressure hose coupling 97 for operation of plunger 83 in one direction with exhaust and pressure functions being reversed for operation of the plunger in the opposite direction which extends to a central vacuum or pressure distribution control 101 (FIGS. 18 and 19). This control is provided only to permit remove application of vacuum and pressure to piston 93 to extract or extend pin 83 into the aperture 31.

Of course, in a less semi-automatic type machine these holding pins or grippers may be manually inserted. But the use of remotely controlled pressure and vacuum offers certain advantages in connection with pins 85 and 87 operated by double piston in cylinder 111, details of which are shown in FIGS. 14-17, the two locking devices comprising double piston cylinders 111 and 113 being one and the same. Thus, in FIG. 14 aperture 29 in panel 11 is shown prior to the extension of pin 87, which is in reality a hollow shaft, to the left. The double piston cylinder 111 comprises a base portion 115 having a flat surfaced foot 117, including bore 118, for abutment against panel 11 around aperture 29. The hollow shaft 87 is adapted to be driven along bore 118 through pressure applied against its piston 121, the pressure being introduced through hollow piston rod 125 for travel along its bore 127 and thence via angular passageways 129 and 131 to the cylinder portion 133 of double piston cylinder 111. This drives piston 121 to the position shown in FIG. 15 to cause hollow shaft 87 to penetrate and extend beyond aperture 29, the air or pressure in the forward portion of cylinder 111 being evacuated through pressure line coupling 135.

Figure 15:
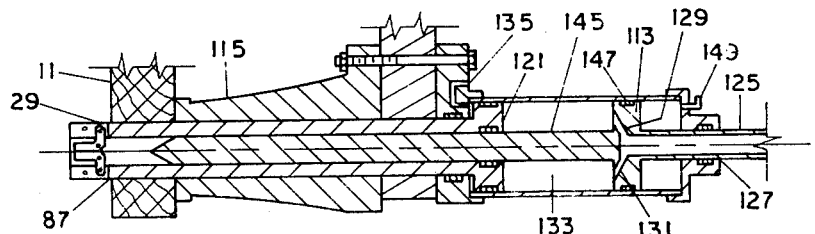
FIG. 15 shows the pin operating device with the hollow shaft penetrating the panel.
Figure 16:
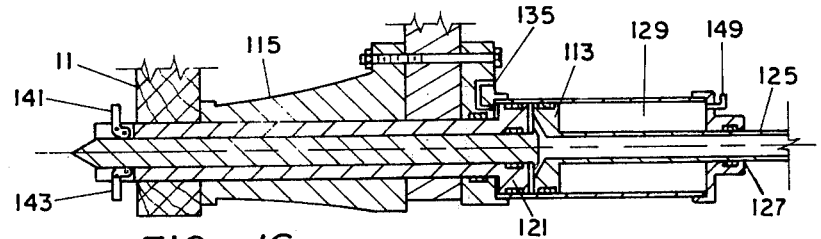
FIG. 16 shows the locking device with the locking pins extended.

Next, it is desired that the locking or gripping fingers 141 and 143 be pivoted from and positioned internally of hollow shaft 87, shown in FIG. 15, to their externally extending positions, shown in FIG. 16. Hence, it is necessary to drive the locking rod 145, from the position shown in FIG. 15, to the position shown in FIG. 16 to pivot grippers or fingers 141 and 143 and to maintain them in their gripping condition. This is achieved by driving the second piston 147 to the left through the introduction of pressure to pressure coupling 149 located at the reverse end of cylinder 133 with air escape being provided through angular passageways 129 and 131 and bore passageway 127. In this connection, it will be noted that hollow piston rod 125 has a length in excess of cylinder 133 to permit the exposed forward extension of locking rod 145 while still maintaining the pressure and pressure release passageways.

Figure 17:
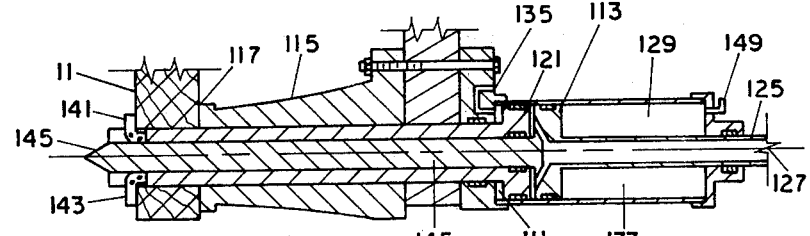
FIG. 17 shows the locking device holding the panel to the panel holder frame.

In FIG. 17, the apparatus in its locked position tightly grips the panel 11 between grippers 141-143 and the foot 117 of base 115, pressure being introduced through coupling 135 to urge piston 121 to the right to achieve this gripping action, pressure coupling 149 serving to release the pressure cylinder 133.

Figure 14:
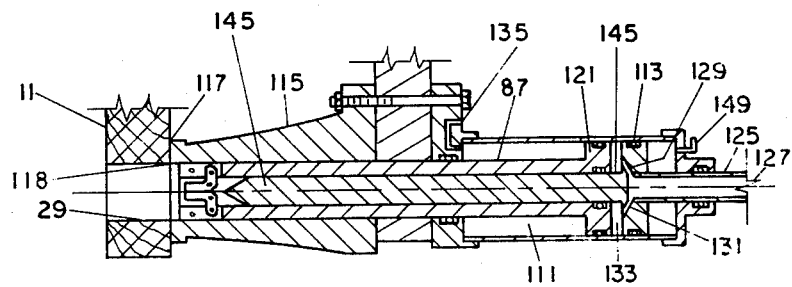
FIG. 14 shows the pin locking device in operative position.

After the panel 11 has been attached in its permanent position, the locking devices 141 and 143 are released and removed from panel 11 by withdrawing locking rod 145 through the application of pressure to bore 127 via hollow piston rod 125 to return it to its position of FIG. 14 and thereafter applying pressure to coupling 135 to return piston 121 to its unlocked position of FIG. 14.

To insure return of grippers 141 and 143 to their closed position for withdrawing hollow shaft 87, at least the tip portion of locking rod 145 may be polarized as a permanent magnet and the grippers composed of soft iron or other magnetizible material to cause them to be returned to their retracted position of FIG. 15 for their withdrawal. An alternative is the use of return springs (not shown), but the magnet approach is preferred as being maintenance free.

Figure 8:
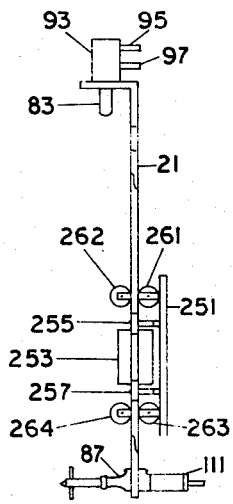
FIG. 8 is a view in side elevation of the panel holding frame, per se.

Returning to FIGS. 4, 5 and 8, it will now be appreciated that the panel holder frame 81 comprises a longitudinal member 201 with peripheral framing members 202, 203 and 204 defining a plane. A diagonal guiding member 207 is provided, in this case to define the angle of the predetermined path of the arrows of FIGS. 2 and 3 when viewed from both sides of the paper. Obviously, guide member 207 could extend at right angles to itself to provide for movement of the panel in the opposite direction when viewed from the same side of the paper.

Figure 9:
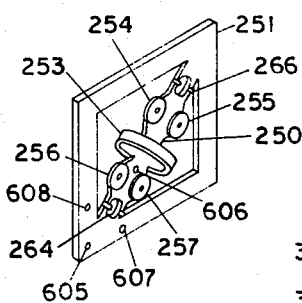
FIG. 9 is a view in perspective of the directional carriage or guideway.

Guide member 207 includes a cut away or framing portion 211 adapted for receiving a cylinder and piston 213, the piston shafts 216 and 217 extending outwardly from opposite ends of cylinder portion 213 and being rigidly connected to opposite ends of the frame or cut out 211 provided by member 207. Thus, cylinder 213 is firmly held and its upper piston shaft 216 when driven upwardly, moves the panel holder frame 81 and panel 11 upwardly at the angle of member 207. This is occasioned by application of pressure to lower line 219. The reverse motion by driving piston shaft 216 outwardly of cylinder 213, through application of pressure to coupling 220, causes the panel holder frame and panel 11 to be driven downwardly and to the left in the direction of diagonal guide member 207. To achieve this predetermined movement of panel holder frame 81 through the use of piston cylinder 211, directional carriage 251 of FIG. 9 is provided with a strap 253 for gripping and holding piston cylinder 213 and a guide way for receiving member 207. The guide way comprises upper wheels or rollers 254 and 255 for receiving the upper edges of member 207 and lower wheels or rollers 256 and 257 for receiving the lower edges of member 207. The lower and upper extremities of guide member 207 are securely and tightly held against deviation by a set of rollers carried by the diagonal guideway member 250 of directional carriage 251 in order that absolute minimal tolerance may be assured. The diagonal member 207 of panel holder frame 81 is completely suspended in the rollers which comprise metal such as iron rollers or ball bearings practically immune from wear and preferably adjustable to receive and locate member 207 relative to directional carriage 251. The lateral location is assured by the four rollers 254-257 and the back and forth location is assured by the other pairs of rollers 261-262 and 263-264, all carried from member 250 by straps or arms, such as the extensions 265 and 266 for upper roller 262.

Figure 10:
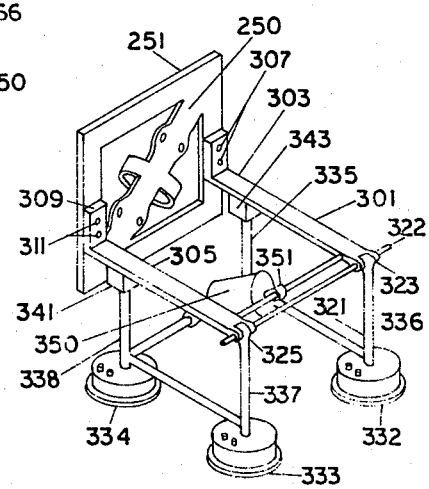
FIG. 10 is a view in perspective of the directional carriage supported by the frame supporting means and the base securing means.
Figure 11:
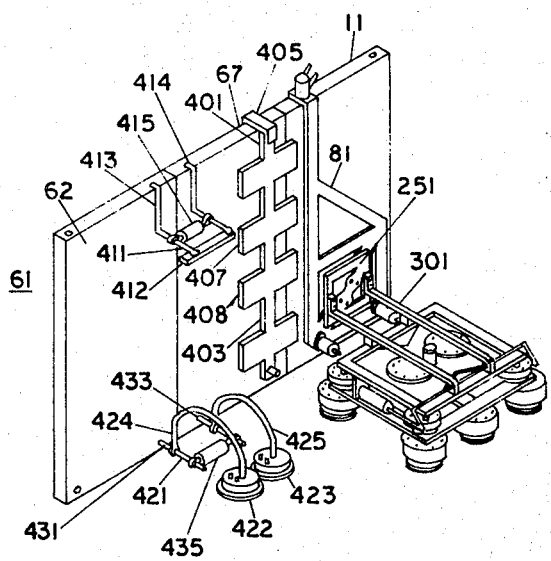
FIG. 11 shows the apparatus of FIG. 10 in operative relationship to a panel wall.

In FIGS. 10 and 11, there is shown the carrier and pivot arrangement for the directional carriage 251. It comprises a frame support 301, made up of arms 303 and 305, affixed to the carriage 251 by the right angle extensions 307 and 309 through the use of screws or rivets, such as 311. These arms are pivotally connected to a base securing frame 321 by a pivot rod 322 which passes through apertured yokes 323 and 325 to permit the carriage 251 to be pivoted from its vertical position to in turn pivot the panel 11 to a horizontal position to facilitate the application of adhesive to its proper edges. Throughout the assembly the parts are heat tempered and the bearing surfaces are machined or built to close tolerances in order that the panels may be assembled in precise predetermined coplanar relationship.

Thus, a firm foundation for the entire apparatus is provided by the base securing frame 321 which rests on four vacuum cups 331, 332, 334 adapted to be secured to a building floor which is preexisting or a temporary floor or support provided therefor. The vacuum cups support the four uprisers 335, 336, 337 and 338 which define a plane through the use of the pivot yoke assembly 323 and 325 and flat plates 341 and 343.

This plane may define a home position for the mechanism from which the panel frame holder 81 may be moved upwardly and to the right or downwardly and to the left along guiding member 250. Thus, it may be appreciated that the predetermined position of the panels, such as is illustrated in FIGS. 2 and 3, may also be determined from this home position, usually coinciding with the directional guide 251 in the position illustrated in FIG. 10. The panel holder frame 81 may be biased upwardly and to the right to hold the panel 11 in the position shown in FIG. 3, thereby constituting the predetermined panel position.

Pivoting of the directional guideway 251 from the position shown at FIGS. 10 and 11 to the horizontal plane (not illustrated) is achieved through the piston cylinder 350 pivotally attached to the base securing frame 321 at pivot point 351 and connected over piston shaft 353 to pivot or crank arm 355 in turn connected to the securing frame arm 305. Removal and return of the panel from the vertical to the horizontal position under control of piston 350 may be accomplished at the remote console or control panel 101 (FIGS. 18 and 19).

Figure 12:
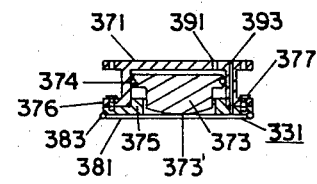
FIG. 12 is a view in section of a vacuum cup in holding condition.
Figure 13:
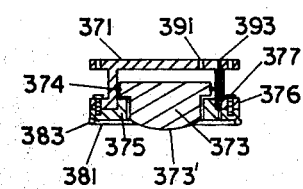
FIG. 13 is a view in section of a vacuum cup in nonholding condition to permit movement of the machine.

The vacuum cups 331-334 provide the function of securely holding the securing frame 301 to the floor or temporary platform during operation and enabling its release and movement of the entire machine to an adjacent position for installation of the next panel. The details of a vacuum cup, such as 331, are shown in FIGS. 12 and 13 wherein a frame or cylinder member 371 receives a piston 373 sealed therein by a ring, such as O-ring 374. The extent of piston movement is determined by the annular sealing ring 375 bolted to flange 376 of cylinder 371 by screws or bolts, such as 377. The annular member 375 includes a large diameter O-ring 381 glued or force-fitted into an annular groove 383. A pressure line 391 is provided to admit pressure to force piston 373 downwardly to insure that the O-ring 383 does not contact the floor when the apparatus is moved. Thus, the lowermost surface of piston 373, shown at 373', may be highly polished or may include one or more rollers to facilitate movement of the apparatus. However, when it is desired that the vacuum cup 331 adhere strongly to the supporting floor or platform, vacuum is applied to line 393, after vacuum has been applied to line 391 to raise piston 373 to the position shown in FIG. 12 so that the cup 331 provides suction attraction with the floor or platform.

In FIG. 11, the entire machine is shown locating panel 11 in position relative to panel 67 of array 61. The panel holder frame 81 had been moved downwardly and to the left by the piston 213 driving it relative to the directional guideway 251, and from FIG. 3 it will be appreciated that the arrows 71, 73 and 75 depict the path followed by panel 11 to the position shown in FIG. 11. An additional guide 401 is shown being employed in the construction of FIG. 11. It comprises a longitudinal member 403 with a hook or right angle 405 gripping the top of panel 67. A plurality of cross pieces, such as 407 and 408 extend beyond panel 67 to define the plane of its interior face thereby further insure that the panel 11 is properly positioned, because guide 401 facilitates checking of the position of panel 11 relative to panel 67 prior to the application of adhesive.

Also, in FIG. 11 there is shown a holding device maintaining the alignment of panel 62 with panel 67, which devices are necessary or useful on windy days until the adhesive has thoroughly hardened or set. The upper holding device 411 comprises a body member 412 with arms 413 and 414 extending in angular fashion over the upper corners of panel 67 and 72 to be pinned in the apertures penetrating their respective top edges thereof. A hand operated piston 415 is shown for holding arms 413 and 414 tightly together.

Also, advantage is taken of the lower panel apertures, by holding device 421 which comprises a pair of vacuum cups 442 and 423 of the type heretofore described having arms 424 and 425 extending adjacent to panels 62 and 67 respectively with pins carried thereby, shown at 431 and 433, held in the apertures and secured by hand operated piston 435.

The holding devices 411 and 421 may only be employed for a relatively few minutes or during the connection of panel 11 to panel 67, and when the machine is moved to the next location for attaching a panel to panel 11, these holding devices may be moved, if necessary, to secure panel 11 to panel 67.

A different embodiment of the present invention is shown in FIGS. 20 and 21, and it is particularly adapted for fabricating floors, ceilings and roofs, wherein the movement of the panels from one plane to another plane for applying adhesive is not accomplished because a different approach is employed in constructing these flat horizontal or inclined surfaces. It is necessary to support, from below, the panel 11' (FIG. 21) during its travel to its proper location relative to the array 501 of FIG. 21 and during setting of the adhesive. Thus, the base securing frame comprises a right angle channel or frame 503 which carries an intermediate member 505 between its arms 507 and 509. Arm 507 is supported by vacuum cup 511 (of the type heretofore described) at its extremity and extends over pivot block 513. Similarly, intermediate member 505 is carried by vacuum cup 515 and extends over pivot 517, arm 509 extending over pivot block 519 to vacuum cup 521. This arrangement enables the base securing frame 503 to extend in cantilever fashion beyond the array 501 to support the directional guideway 251 of FIG. 9, piston 213 and panel holder frame 81 of FIG. 4 and panel 11' of FIG. 21 in a precise predetermined position (although basically this panel 11' is supported from beneath but it is aligned for movement along the predetermined path by the machine embodiment of FIGS. 20 and 21).

The operation is as described before without the provision for pivoting the panel, panel holder frame and directional guideway, panel 11' being simply moved an inch or few away from array 501 by piston 213, adhesive applied to the appropriate edges, and then returned to its matching position by operation of piston 213.

Thereafter, internal reinforcing members, such as the pictured 2 × 2, is inserted in channel 551 to extend halfway into panel 11' and to protrude halfway along the upper channel 553 of panel 555, being available as a reinforcing structure when additional panels are added. It may be seen from viewing the broken away portion of lower lefthand panel 561, that the channel 565 comprises an upper lateral 2 × 2 shown at 563 and a lower lateral 2 × 2 shown at 565 spaced therefrom but contained within the opposing faces 571 and 573 and fastened to the vertical edge peripheral frame members, such as 575 and 577. Also, it will be apparent from the view of FIG. 21 that floors and the like are preferably constructed in staggered relation to enable maximum benefit from the reinforcing members located in upper and lower edge channels and intermediate channels as just described.

The right-hand panel 581 of FIG. 21 is shown spaced from the array 501 to illustrate how the reinforcing internal members 582, 583, and 584 fit respectively the upper edge channel 586, intermediate channel 587 and lower channel 588. Of course, it will be appreciated that panel 581 may comprise the initial panel, from which the rest of the array 501 has been laid, and it is clear then that panel 581 will be supported from the bottom. In the case of roofs, obviously the array 501 may be supported in a slanting plane, such as a 30° or 45° plane to the vertical, and the machine will then operate from the lowermost roof panel upwardly to the peak or ridge.

It should be noted that in FIG. 20 apertures 601, 602, 603 and 604 are provided in the base securing frame 503 for receiving bolts which pass through, respectively, apertures 605, 606, 607 and 608 of guide 251, shown in FIG. 9. These apertures are the only additional change required relative to the parts heretofore described, because the operation of panel holding frame 81, relative to directional guide 251, is identical to that previously described.

FIGS. 22 through 27 illustrate a further embodiment of the invention which enables the tilting or angling of the panel 11 in order to insure that it will be brought into its proper coplanar orientation and contact with the array, even though the platform or floor upon which the machine is resting is uneven or out of level. Thus, an arrangement is provided for introducing angling, tilting and even skewing into the machine between the base securing frame, shown at 701 if FIG. 22, and the frame support 301, the latter carrying the directional guideway 251, panel holder frame 81 and panel 11. It is the orientable base 703 which is angled, tilted or skewed relative to the base securing frame 701, and the frame support 301 is connected to the orientable base 703 through the yokes 325 and 323 of arms 305 and 303, respectively, by virtue of pin or rod 322 extending through the yokes 325 and 323 and engaging upright inverted U-shaped pin holders 705 and 707.

In FIG. 22 the base securing frame 701 is secured to the floor or other platform by the vacuum cups 711, 712, 713, 714, etc. and the orientable base 703 is supported by piston shafts (not shown in FIG. 22) extending upwardly from locking and alignment pistons 721 through 726. A pair of valves 750 and 751 controls and locks the pistons in any desired position so that the base 703 may be oriented and locked, as desired.

The principle is illustrated in FIG. 27 with respect to two cylinder assembly pistons 761 and 762 operating with two valves 763 and 764. Let it be assumed that piston shaft 765 bears against a table top or the like at one end and piston shaft 766 is similarly not connected to the table top on the opposed edge, and it is desired to tilt the table in teeter-totter fashion. If it is desired to raise the end of the table top associated with shaft 765, this piston 767 is pulled upwardly with both valves 763 and 764 open so that fluid is discharged from the top of piston 767 via line 768 into valve 763 below its closure member 769. The pressure is, of course, relieved from coupling 771 to permit closure member 769 to rise, thereby insuring that conduit 768 opens into valve 763 with vented reservoir 770 provided for excess fluid in this closed fluid system when the closure member 769 is closed downwardly to lock the openings of conduits 768 and 772 through pressure applied to coupling 771. Similarly, valve 764 is locked through pressure applied to coupling 775 to force closure member 777 downwardly to close conduits 778 and 779 with excess fluid rising in reservoir 770.

Of course, with the valves open, either or both piston shafts 765 and 766 may be positioned as desired to align the table top corresponding to orientable base 703 of FIG. 22, which in turn serves to align the panel 11 for simultaneous coplanar contact along the required edges with the existing array.

In FIG. 27A there is a detailed showing of how the valve closure member 769 closes the opening for conduit 772. An O-ring 783 surrounds the opening for conduit 772 and when the closure member 769 descends, it merely seals this O-ring 783 to close off conduit 772. It should be noted that the closure member 769 may be lifted by vacuum applied to coupling 771 and depressed by pressure applied to the same coupling. The entire movement necessary for valve operation is of the order of ¼ to ½ inch elevation and depression of closure member 769, and thus reservoirs, such as 770, need not be large but the fluid system must be closed.

A great number of pistons and corresponding alignment shafts may be operated from a pair of valves, such as valves 763 and 764, by providing couplings from the tops of the pistons to the bottom of one valve and couplings from the bottoms of the pistons to the bottom of the other valve. It is in this manner that the principle described in FIG. 27 is extended to operate, e.g. six pistons from two valves.

In FIGS. 23 through 26 there is shown a detailed array incorporating the same principle but utilizing four pistons, namely 801, 802, 803 and 804 respectively located at the corners of the orientable base 805 supported from the base securing frame 807. The base securing frame includes the same type vacuum cups 808 through 813.

A pair of valves 815 and 817 is provided with connections from the upper portion of the pistons, such as line 820 from piston 801. extending to the bottom of valve 815, but with connections, such as line 821, extending from the bottom of piston, such as 801, to the bottom of the other valve 817, this pattern being continued for all pistons so that the orientable base may be tilted, angled or tipped as desired. Additionally, a universal pedestal 825 is disposed between the centers of the base securing frame 807 and orientable base 805 to insure full universal movement, i.e., including skewing of the base 805 relative to the base securing frame 807.

The pedestal 825 includes a base 827 adapted to be secured to a cross member 829 of base securing frame 807. At its upper end it carries a ball 829 on a neck 831 extending from the body 833. The body 833, neck 831 and ball 829 may all be machined from the same piece of material or the latter may be machined and attached to the body 833. A universal clamp 835 for ball 829 is provided through an upper body member 837 and a lower body member 839, secured together by the bolts 840 and 841, which clamp the body members in tensioned fashion. The upper body member 837 is adapted to be secured to a panel 850 of the orientable base 805 by bolts through apertures 851 and 852.

Each piston, such as 801, includes an upwardly extending piston rod, such as 861, to carry the orientable base 805 at its four corners. The piston rods, such as 862, include a ball, such as 863, in their upper ends to permit the base 805 ready point contact therewith and movement in any direction therefrom.

It is desirable for high speed operation to operate the machines of the present invention from a remote single location relative to the various moving parts which are simply moved through the use of pressure or vacuum. Pressure, vacuum and timing sequencing control systems are commercially available from many sources, and accordingly, only the valving connections are shown where required. Thus, at the central location there is provided a source of pressure, such as the compressor 901, shown in FIG. 18 supplying the pressure distribution control 101 over line 903 and manifold 905, the individual conduits of which include the valves, such as 907 and 909. Manually operable buttons 911 and 913 are provided for operation of the valves 907 and 909 and a settable timer mechanism is shown at 915 for controlling the period that panel 11 is retracted after applying adhesive to the edges for optimum setting time. The various couplings mentioned throughout the specification requiring pressure are connected to pressure distribution control 101. Similarly, a source of vacuum, such as the vacuum pump 925, also supplies pressure distribution control 101 (from the opposite side) over conduit 927 and manifold 930. Similarly, valves, such as 931 and 932 are controlled by buttons 933 and 934 for performing the various operations.

In general, the preferred embodiment of FIGS. 28 – 41 is based on a stevedore type carrier which enables one man basically to pick up, move, fit, and bond the first panel to the floor and subsequent panels to adjacent panels and the floor. It incorporates mechanical advantage for lifting, remote controlled load levelling and independent support, indexing to existing structure and lateral movement of the panel for exact fitting, and floor locking for stabilization during the bonding operations.

Figure 28:
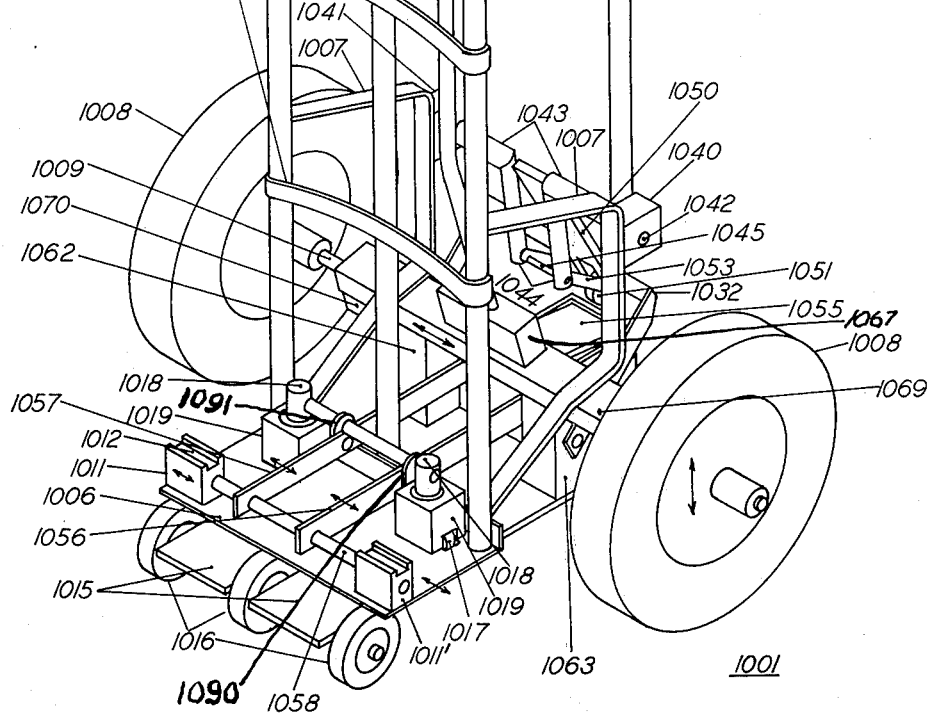
FIG. 28 is a view in perspective of a stevedore-type portable carrier equipped for lateral and pivotal movement of the panel to be assembled; also transport thereof.
Figure 41:
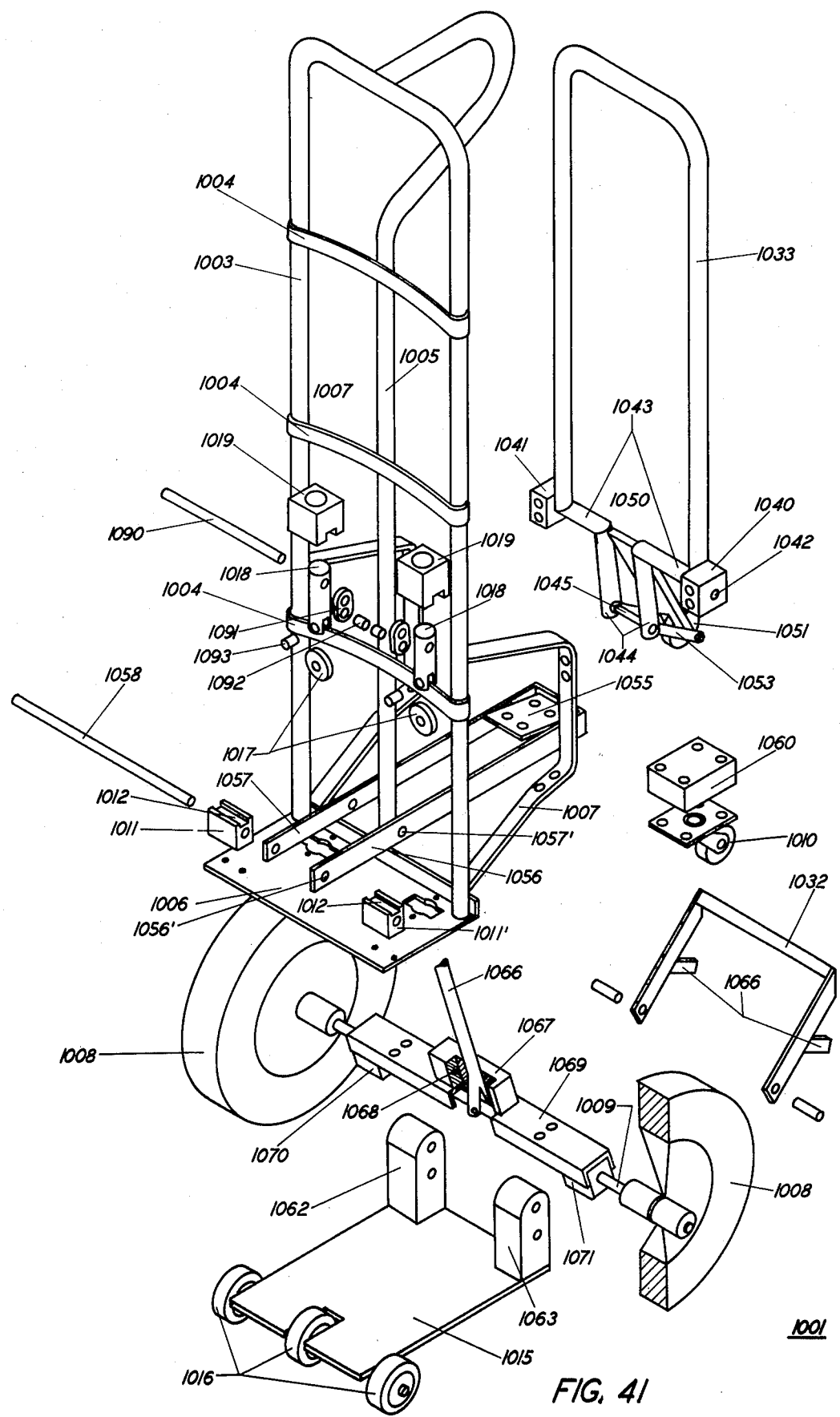
FIG. 41 shows the basic stevedore, as modified in exploded perspective.

The stevedore type portable carrier is shown best in FIGS. 28 and 41 at 1001. This carried may be made anew or may be started from a standard stevedore with substantial modifications and additions made thereto. Thus, the stevedore frame comprises the usual ladder type backing consisting of the vertical U-shaped tubular member 1003 with lateral ribs 1004 and vertical strengthening rib 1005. It also includes the stevedore lift platform 1006, wheel attaching straps 1007, wheels 1008 and axle 1009.

The foregoing structure was modified to enable the movement and control of heavy and expensive loads, such as 200 pound 4 by 8 feet plywood panels without requiring tilting backwards of the stevedore. The modifications further enable the portaging of such loads to building or assembly locations and permit the lateral movement of the load relative to the carrier in precise repeatable location relative to the wall or other thing being constructed. Additionally, the incorporation of a pivot wheel 1010 (FIGS. 30–33) permits "wiggling" of the plywood panel into its construction position. Additionally, the load may be cammed upward away from the floor and lowered downward to rest on the floor, the panel holding apparatus being also carried by the carrier to impart the 45° reciprocating movement to the plywood panel while the carrier is locked relative to the floor.

Figure 35:
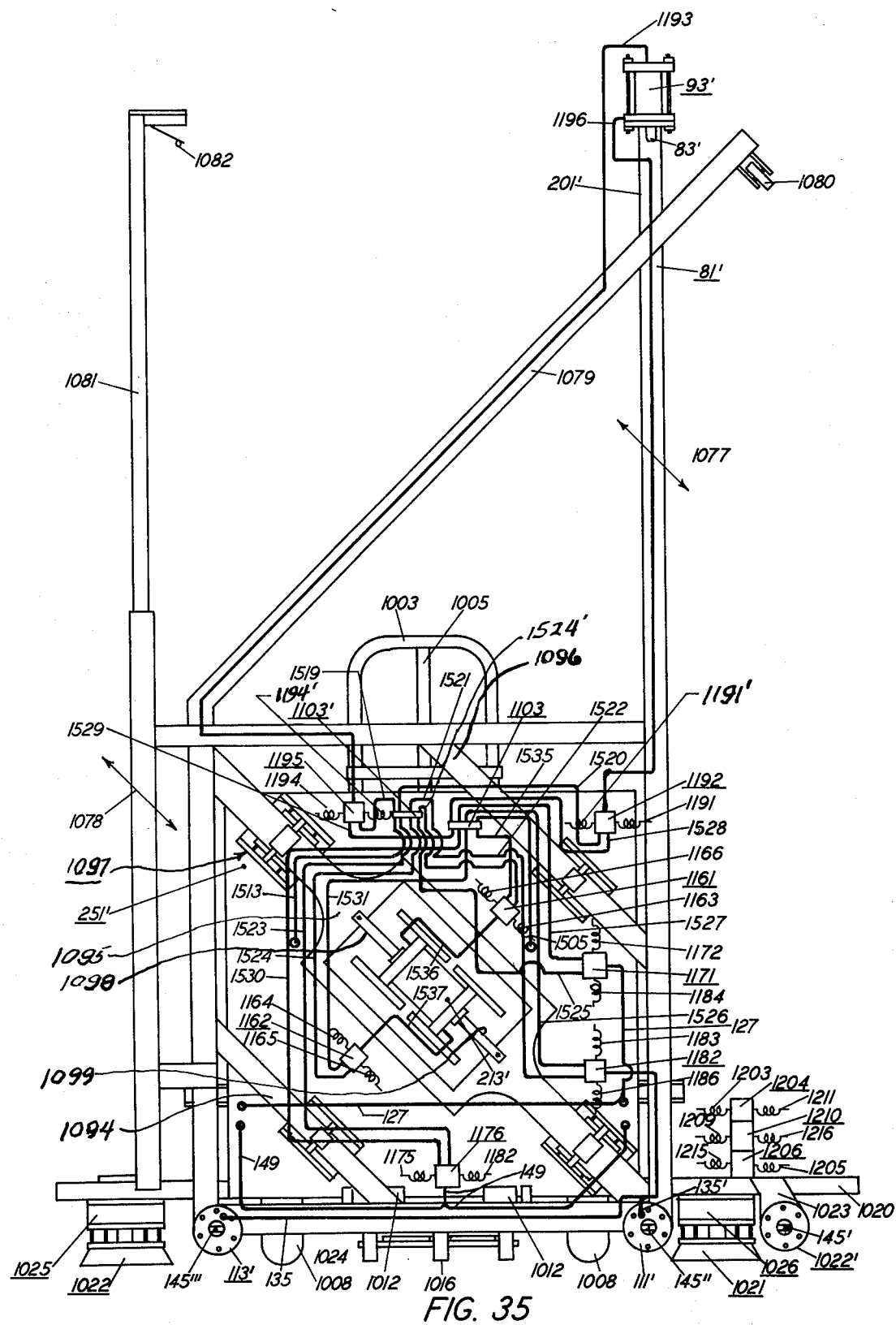
FIG. 35 is a view in front elevation of the panel holding apparatus in position on the directional carriage in turn in position on the stevedore-type carrier.

The stevedore lift platform 1006 includes uprights 1011 and 1011' (FIG. 28) having machined slots 1012 for receiving the lower edge of the directional carriage 251' (FIG. 35). The directional carriage 251' is further fixed to the stevedore carrier by the bolts 1013' also the directional carriage 251' is secured to the U-shaped tubular member 1003 of the carrier by the control panel 1014 of FIG. 38 extending therebetween (FIG. 33).

In order to provide for lateral movement of the stevedore lift platform 1006, U-shaped frame member 1003, and wheel supports 1007 relative to carriage wheels 1008, it is necessary to provide the additional load bearing platform 1015 (FIG. 28) herein illustrated slotted to receive the middle wheel of the three load bearing front wheels 1016 (two or more wheels or rollers could replace this showing). FIG. 41 shows how the parts can be separated from the stevedore lift platform 1006, enabling the movement by virtue of the load bearing lateral wheels 1017 respectively carried by the uprights 1018 mounted in the guide blocks 1019. The upright members 1018 are U-shaped at their lower extremities (FIG. 41) to carry the lateral wheels 1017; and the uprights themselves are adapted for vertical movement relative to their guide blocks 1019. Beneath each guide block 1019 there is a slot in the stevedore lift platform 1006 for the movable uprights 1018 to enable the lateral wheels 1017 to be urged downwardly against the load bearing platform and further separate the two platforms. The separation created may be small, and the vertical movement of the lateral wheels need be, e.g., only ¼ to ⅜ of an inch or the like. Thus, in FIG. 30, the mechanism is shown with the lift platform 1006 in its closed position to load bearing platform 1015, such that the plywood panel (not shown) is on the floor, but in FIG. 31, the uprights 1018 have been pressed down the slight distance further to separate the platforms 1006 and 1015 sufficiently to lift the plywood panel off the floor.

This separation enables transport of the plywood on the carrier 1001 from one location to another; and aids in the exact positioning of the plywood panel adjacent to the wall being fabricated. The left-right movement is permitted because upstanding posts 1062 and 1063 press fit axle 1009.

Figure 36:
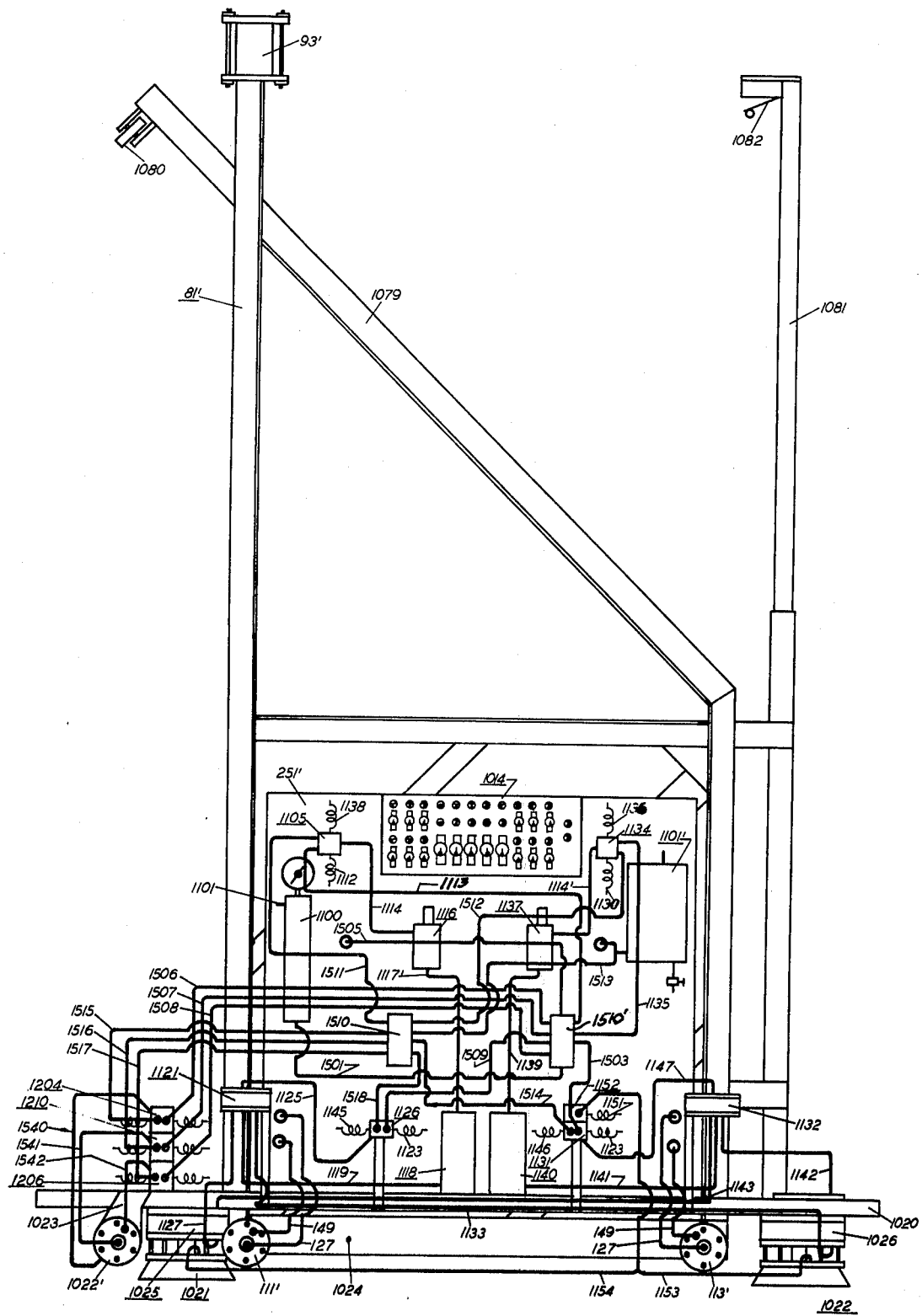
FIG. 36 is a rear view of a portion of the structure of FIG. 35 with the stevedore-type carrier removed.

Another reason for this separating movement between the platforms is to enable the upper gripper plunger 83' to pass over the plywood panel, thereafter to be inserted therein from the top. Finally, a fourth reason for the movement is to enable the raising and lowering of the plywood panel adjacent to the wall in order to locate the indexing gripper structure carried by locking rod 145' in an indexing hole in the wall (not shown). The indexing hole in the adjacent plywood panel receiving locking rod 145' may by typified by hole 27 in FIG. 1 after panel 11 is bonded in position. The panel being handled is held at its lower extremity by locking rods 145'' and 145''' and their associated grippers (FIG. 36).

The bar 1020 (FIG. 35) which carries the vacuum cups 1021 and 1022 is secured to the rear of the directional carriage 251'. The optional, but usually very desirable, double piston-cylinder 1022' for locking or indexing is shown fixed to the bar 1020 by strut 1023, but the non-indexing double piston-cylinders 111' and 113' are carried by the lower cross bar 1024 of the panel holding frame 81'. The supporting structure for vacuum cups 1021 and 1022 comprises the cylinders 1025 and 1026 (FIG. 37) housing the pistons 1028 and 1029 (FIG. 37) which operate the feet 1030 and 1031.

Figure 30:
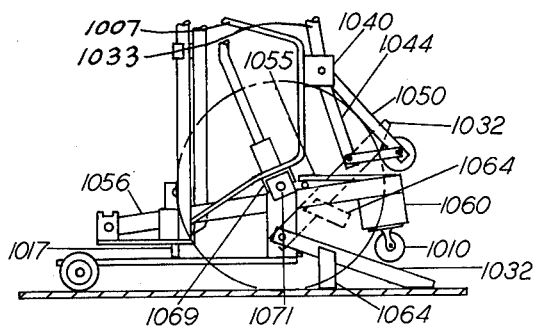
FIG. 30 is a representation in side elevation to a reduced scale of a portion of the structure of FIG. 28 to show the mechanism with the plywood panel on the floor.
Figure 31:
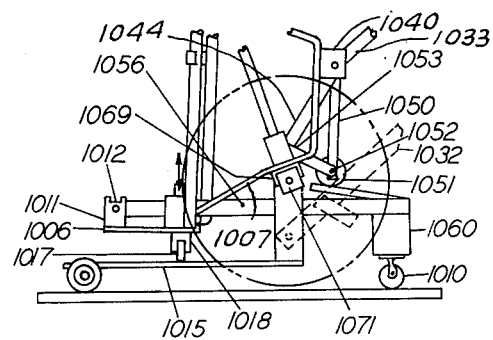
FIG. 31 is a similar showing of the mechanism but with the plywood raised from the floor.

The panel holding frame 81' and directional carriage 251' thus are supported by the feet 1030 and 1031 within the vacuum cups 1021 and 1022, and it is important to note that the elevation of the lower edge of directional carriage 251' exactly corresponds to the height of the machined slots 1012 of the uprights 1011 carried by stevedore lift platform 1006, such that when the directional carriage 251' is gripped by these uprights with the stevedore apparatus in the position of FIG. 30, (i.e. no lift), there is no weight on the carrier as a result of the directional carriage and panel holding frame, regardless of whether the panel is present or absent.

It is also important to note that the pressure in the system is adjusted so that the feet 1030 and 1031, in the vacuum cups 1021 and 1022, may never raise the apparatus in the presence of the panel serving as a load, but is capable of raising the apparatus in the absence of the panel load. Thus, the maximum air pressure to be contained in the system (subject to relief) is adjusted relative to the weight of the directional carriage 251' and panel holder frame 81' to achieve the foregoing requisites.

Other provisions are built in for insuring an entirely rigid mechanism in order to exactly lift the heavy loads, such as the 200 pound plywood panels, and to position them with extreme accuracy. These include arrangements to avoid the resiliency of the rubber wheels 1008, and to insure direct operating linkages where necessary. For example, with the feet being urged downwardly with less force than is required to lift the mechanism when loaded with a panel, the mechanism is actually urged upwardly and the panel is tightly fixed thereto. The vacuum forces are provided to hold the mechanism rigidly to the floor with great pounds per square inch.

The lift handle 1033 is pivotally mounted by blocks 1040 and 1041 which are carried by the wheel straps 1007 (FIG. 28). The pivot pin is shown at 1042. Thus, it may be seen that lift handle 1033 extends symmetrically inwardly at the level of pin 1042 (FIG. 41) to comprise the horizontal reaches 1043, and then depends at 1044 to receive the further pivot pin 1045. A toggle mechanism is arranged with lift handle in the form of the long flat arm 1050 extending from pivot pin 1042 to carry the cam roller 1051 in a slot in its lower extremity for rotation relative thereto about pin 1052. A short arm 1053 extends from pin 1052 to pin 1045 on either side of cam wheel 1051 to complete the symmetrical camming apparatus. The short arms 1053 are preferably adjustable to determine the extent of movement of lift handle 1033 required to toggle or lock the mechanism in its downward position.

The cam roller 1051 is adapted to ride on roller plate 1055 which is welded to or fixed at a slight angle to the pivotal arms 1056 and 1057 which raise and lower the lateral wheels 1017 via uprights 1018. Arms 1056 and 1057 pivot about the pin 1058 carried by the milled or slotted uprights 1011.

Thus, when it is desired to lift the panel for any reason, it is only necessary to draw back on the lift handle 1033 which results in the cam roller 1051 depressing the cam roller plate 1055 to cause the further separation between the platforms 1006 and 1015 which lifts the panel off the floor. Further rearward movement of the lift handle 1033 causes the pivot wheel 1010, which is carried by block 1060 in turn carried by the pivot arms 1056 and 1057, to reach the floor. Further movement of handle 1033 lifts the big wheels (rubber tired) 1008, thus forming a solid base of load bearing wheels 1016 and pivot wheel 1010 for handling and manuevering the heavy plywood panel. This is accomplished because cam wheel 1051 rides forward on cam roller platform 1055 thereby actually lifting the pivot block 1040, in turn attached to the big wheel bracket 1007 to lift the big wheels.

With all of the little wheels on the floor and the big wheels 1008 raised, a large platform is provided for wheeling the expansive and heavy plywood panel from one location to another, and the pivot wheel 1010 permits the sharp orientation of the panel to bring it closer to the desired position. Also, this vertical movement due to lift handle 1033 is utilized in lowering the stevedore lift platform 1006 with milled uprights 1012 to pick up the directional carriage 251' and panel holding frame 81', and thereafter to raise and lower these parts for initially gripping the panel and subsequently fitting it to the wall.

It is during the fitting stage that it is desirable to have a rigid platform for precise handling of the panel and for this purpose the foot pedal 1032 is depressed to the position shown in FIG. 30, from its normal upper position shown in dotted outline at 1032, also in FIG. 30. The foot pedal 1032 is attached to the upstanding posts 1062 and 1063 by respective pivot pins. A pair of depending arms (only one being visible) 1064 which may be fastened together to provide a U-shaped configuration, is carried by the foot pedal 1032 to provide an additional floor rest, and by standing on the foot pedal 1032, two further contact surfaces are provided in the rigid foundation now formed for the precise handling of the plywood panel.

Figure 29:
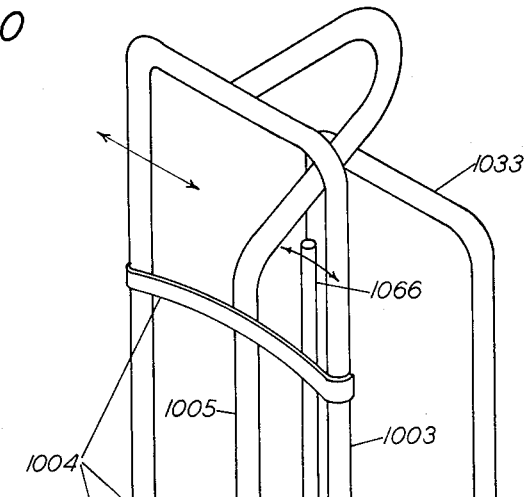
FIG. 29 is a view in detail of a portion of the structure of FIG. 28.

In the final fitting stage, lateral movement is available to the operator to shift the stevedore frame 1003, and consequently panel and intermediate components to the left or right through the movement of the lever or lateral handle 1066. Reference to FIG. 29 shows that the lateral handle 1066 is pivotally connected to lateral sliding frame 1069 carried by axle 1009. Pivot box 1067 includes an upper opening tapering into a truncated lower opening 1068 (FIGS. 29 and 41) enables lateral movement of the lever 1066. The opening 1068 also penetrates the slideable frame 1069 supported from the axle by depending arms 1070 and 1071 including slide bearings therein. Frame 1069 is a further modification to the original stevedore in order to permit lateral movement of the stevedore relative to the big wheels 1008. Thus, the axle 1009 is press fitted or otherwise secured in the upstanding posts 1062 and 1063 and the axle is restrained from any movement relative thereto such that lateral displacement of the axle 1009, by movement of the lateral handle 1066, displaces the stevedore lift platform 1006 and its associated components in the same direction, because the load bearing platform 1015 remains fixed.

The amount of displacement is determined by the spacings shown by the two arrows 1072 and 1073 (FIG. 29) which are preferably set equal. The lateral movement can be effected at any time, but since a great amount of weight is bearing on the lateral wheels 1017 the mechanism does not shift itself but rather requires a fairly heavy pull on the lever 1066 to shift, when desired. Wheels 1017 are journaled in plungers 1018 on axles 1093, in turn carried by guide blocks 1019 secured to platform 1006. Crossbar 1090, link 1091 and stud 1092 connect the plungers 1018 to arms 1057 for actuation.

With all the foregoing types of movements available, the panel can be brought to a proximal position to the wall being constructed, and aligned both vertically and horizontally in its position to be assumed permanently.

As a matter of fact, once the operator has achieved his most satisfactory placement, the fott pistons 1028 and 1029 are unlocked and the feet 1030 and 1031 are raised and then lowered such that the panel essentially orients itself slightly against the preceeding permanent fixed panel and the floor, at which time the foot pedal is depressed and the suction applied to lock the load bearing platform 1015 in the installing position.

FIGS. 33, 35 and 36 show the panel holder frame 81' and directional carrier 251' in operative relationship, FIG. 33 showing the total assembly of the components necessary to handle the panels. The directional carriage 251' is the main panel holder frame or base and comprises a flat plate carrying the pneumatic and hydraulic operating components to be described, including the cylinder and piston 213' (FIG. 35) which drives the panel holder frame 81' (FIGS. 35 and 36) in the reciprocating angular direction of the double arrows 1077 and 1078 of FIG. 35 (usually approximately 45°). The framing for panel holder frame 81' includes vertical member 201' carrying piston-cylinder 93' with depending plunger 83'. However, an additional framing member 1079 is included, along with an indexing roller 1080, for indexing to the adjacent already installed wall or panel. Also, the additional indexing gripper assembly 1022' including shaft 145' is provided. A vertical member 1081 includes at the top thereof a sensing micro-switch mechanism 1082. In initially picking up a panel, the lift handle 1033 is brought rearwardly to permit the piston-cylinder 93' to pass over top of the panel. Then, as the lift handle 1033 is returned to its upper position the plunger 83' passes over the panel and the sensing switch 1082 switches from red light 1084 on control panel 1014 to white light 1085 thereabove to signal the operator to actuate the double piston-cylinders 111' and 113' to cause the lower openings in the panel to be gripped, and thereafter, actuate piston-cylinder 93' to extend plunger 83' into its corresponding opening in the plywood panel.

Panel holder 81' includes diagonal crossbars 1094, 1095, and 1096. Crossbar 1095 includes a central cutout portion for the actuating cylinder 213', which is fixed to carriage 251', and moves panel holder 81' by extending either connecting rod 1098 or 1099, because one end of each of the connecting rods is affixed to the panel holder 81'.

Four bearing arrangements, such as 1097, guide the panel holder 81' in its reciprocating angular movement relative to main frame or carriage 251'.

Figure 37:
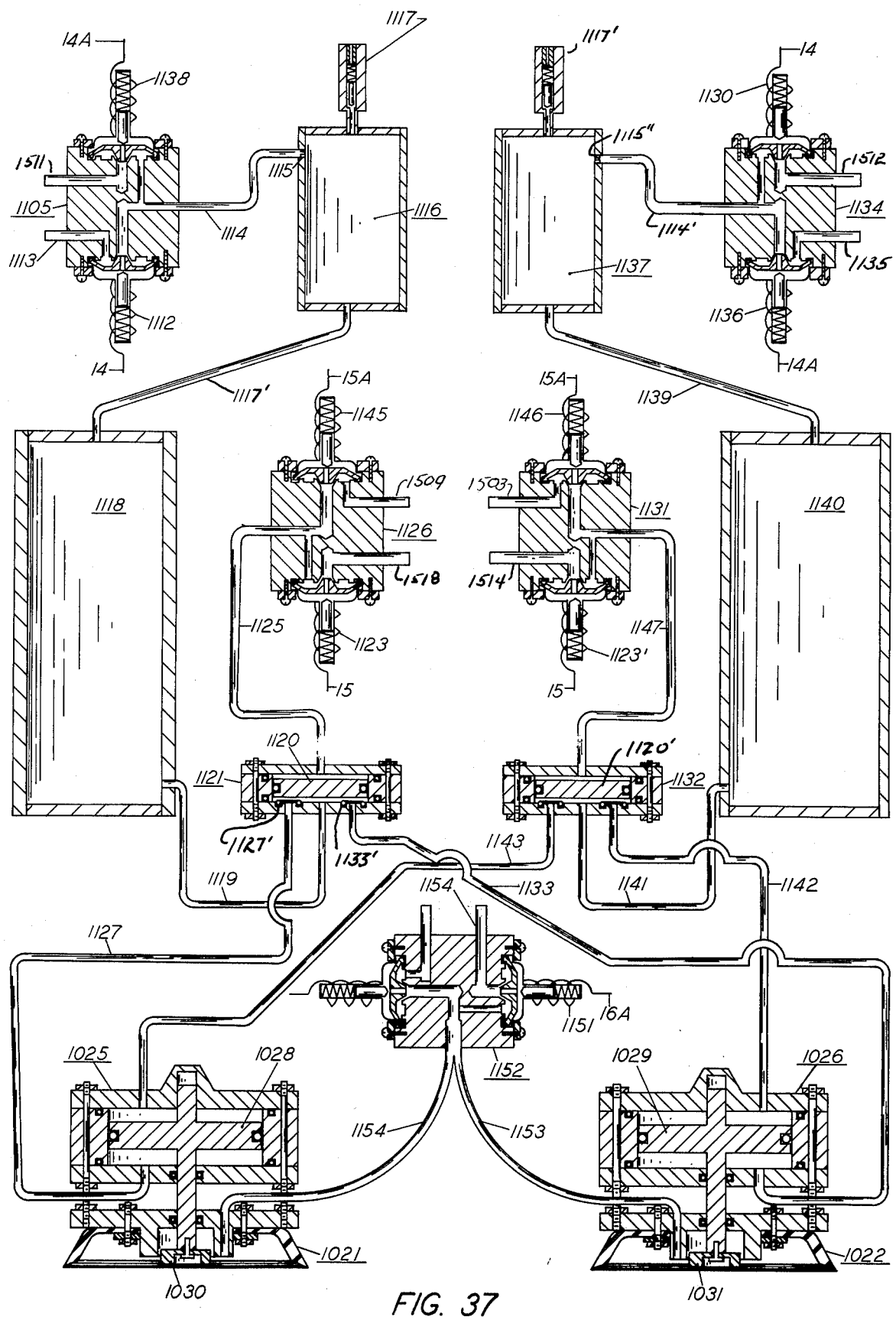
FIG. 37 is a view of the pneumatic fluid system for raising and lowering the feet of the directional carriage, as well as applying and relieving suction to and from the vacuum cups.

Referring to FIGS. 35 - 37, the operation of the fluid control system will be explained. Inlet air pressure of approximately 50 pounds per square inch is applied to pressure tank 1100 (FIG. 36) at inlet 1101. A hose (not shown) usually from a portable compressor supplies high pressure air to pressure tank 1100, which in turn supplies the components shown on the back side (operator's side, FIG. 36) via conduit 1501 and high pressure manifold 1510', and also supplies high pressure air to the inlet manifold 1103 on the reverse side of carriage 251' over conduit 1505, best seen in FIG. 35. The exhaust manifolds are 1103' (FIG. 35) and 1510 (FIG. 36). Exhaust is supplied to solenoid valves 1105 and 1134 (FIGS. 37 and 36) over conduits 1511 and 1512 respectively from exhaust manifold 1510. High pressure is extended from manifold 1510' to solenoid valve 1105 via conduit 1113 and to solenoid valve 1134 via conduit 1135.

The only reason to raise the feet is to keep the feet off the floor while moving the machine. To initiate the foot raising, switch 1111 (FIG. 38) is pushed to position 14 to energize solenoid valves 1112 and 1130 (FIG. 37) which opens the high pressure passageway 1113 through solenoid valve 1112 of valve 1105 and the passageway 1114' through solenoid valve 1134 into exhaust passage 1512. The high pressure passageway 1113 in valve 1105 allows pressure to be applied through conduit 1114 to pin hole 1115 at air chamber 1116 where a desired pressure is maintained by relief valve 1117. In the same instance, solenoid valve 1130 in valve 1134 being energized allows exhaust passage 1114' to be opened in solenoid valve 1134 discharging pressure into exhaust passage 1512.

The air pressure via conduit 1117' (FIG. 37) presses down on the liquid, e.g., anti-freeze, in the liquid tank 1118 to transmit force over conduit 1119. Then switch 1122 (FIG. 38) is moved into position 15, energizing solenoid valves 1123 and 1123' (FIG. 37), to open the valves to exhaust passages 1518 and 1514. This exhausts the top side of locking pistons 1120 and 1120' of liquid locking valves 1121 and 1132 by this pressure relief allowing the pistons 1120 and 1120' to move upward, opening passages in valves 1121 and 1132, sealing O-rings 1127' and 1133' surrounding the openings of conduits, such as, 1127 and 1133 to comprise good seals when piston 1120 compresses them.

Liquid pressure over conduits 1127 and 1133 flows to the bottoms of pistons 1028 and 1029 to lift these pistons as liquid flow from the top of pistons 1028 and 1029 through conduits 1142 and 1143 and is now permitted through valve 1132 and via passage 1141 into tank 1140. Air pressure on top of the liquid in tank 1140 passes through passage 1139 into chamber 1137. It passes out through jet 1115', via valve 1130 of solenoid valve 1134 into exhaust passage 1512. Thus, feet 1030 and 1031 are raised.

When the feet have been fully raised, switch 1122 (FIG. 38) is pushed to the 15A position, applying pressure through high pressure lines 1509 and 1503 of valves 1145 and 1146 in solenoid valves 1126 and 1131 and via conduits 1125 and 1147 to the top of pistons 1120 and 1120', pushing these pistons down in locking valves 1121 and 1132, thereby closing all passages extending to conduits 1119, 1127, 1133, 1141, 1142, and 1143 allowing no fluid passage. Pistons 1028 and 1029 hold the feet 1130 and 1131 raised.

Now for lowering the feet, switch 1111 is thrown to the upper position 14A (FIG. 38) and high pressure air is now passed over conduit 1135 (FIG. 36) to solenoid valve 1134, this time to energize lower unit 1136 and pass the pressure into conduit 1114', via metering passage 1115' and admit pressure to air chamber 1137, with relief valve 1117' regulating the maximum air pressure which is applied on through conduit 1139. Also, solenoid valve 1105 is simultaneously energized at its upper unit 1138 to open the exhaust ports.

Air pressure thus proceeds via conduit 1139 to pressure the liquid in tank 1140 which in turn pressures conduit 1141. Then switch 1122 is moved to position 15 to energize valves 1123 and 1123' of solenoid valves 1126 and 1131 allowing exhausting of pressure on top of pistons 1120 and 1120' through conduits 1125 and 1147 via valve 1123 and valve 1123' into exhaust passages 1518 and 1514. This allows pistons 1120 and 1120' to move up, opening valve 1132 leading to O-ring equipped passages 1142 and 1143 through force into cylinders 1025 and 1026 moving pistons 1028 and 1029 downward to move feet 1030 and 1031 down. Also the liquid in the bottom of the cylinders 1025 and 1026 is forced out through conduits 1127 and 1133 and through the bottom of the locking valve 1121, conduit 1119, into tank 1118, forcing the air pressure above it out through conduit 1117', into chamber 1116, and out through metering jet 1115, via conduit 1114, and valve 1138 of solenoid valve 1105 into exhaust passage 1511. Pressure in continuously applied until the feet are tight against the floor as determined by the pressure which is set by the relief valve, as shown at 1117'.

Figure 38:
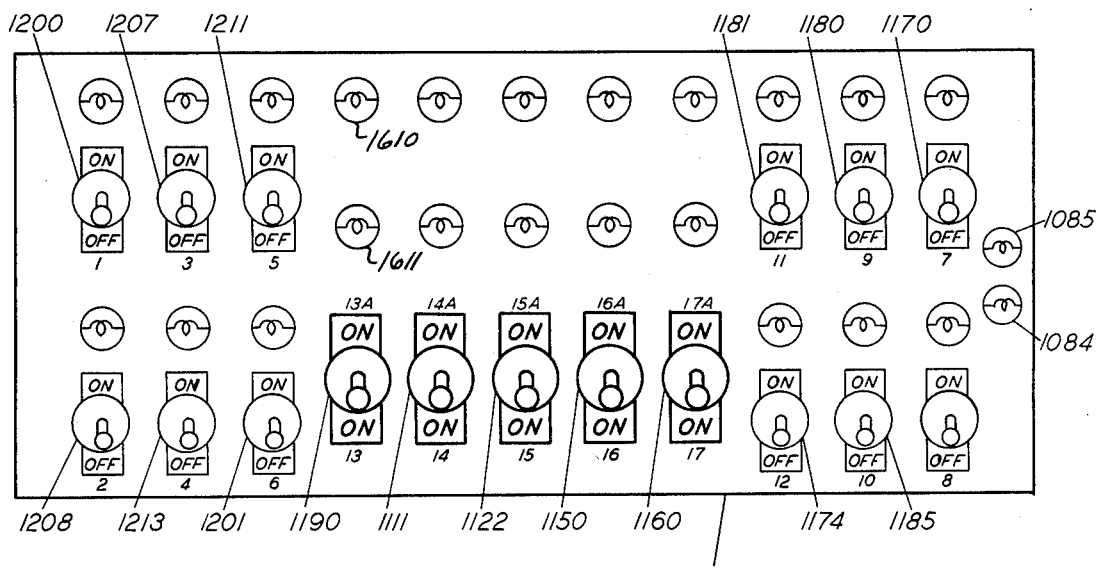
FIG. 38 is a view in front elevation of the control panel showing the various switches and lights for use in sequencing the operational steps.

When the feet have been fully lowered, then switch 1122 in FIG. 38 is pushed to the 15A position, allowing pressure to be applied through high pressure lines 1509 and 1503, valves 1145 and 1146 in solenoid valves 1126 and 1131, extending pressure through conduits 1125 and 1147 to the top of pistons 1120 and 1120', pushing these pistons down in locking valves 1121 and 1132 and closing all passages allowing no fluid to enter or return from the cylinders 1125 and 1129. This holds pistons 1028 and 1026 rigid which in turn secure feet 1130 and 1131.

Once the final alignment is achieved, suction is applied to the vacuum cups 1021 and 1022 to aid in maintaining the structure fixed in that position to the floor. This is achieved by fliping the singly connected switch 1150 (FIG. 38) to position 16A which energizes unit 1151 of the solenoid suction valve 1152, the left hand section of this valve not being used. Energization of unit 1151 opens the vacuum cups 1021 and 1022 to exhaust via conduits 1154 and 1153. Exhaust port 1154 for the suction valve 1152 is connected directly to the vacuum pump (not shown in FIG. 38) which is run at approximately 10 to 15 inches of vacuum.

Once the final position is fixed, it is only necessary now to move the panel away from the home position by moving switch 1160 to the up position, shown at 17A, which allows the pressure to enter main driving cylinder-piston 213' via the solenoid control valve 1161 and to exhaust from the main cylinder piston 213' at its opposite end via the solenoid valve 1162 which has its exhaust port opened. Thus, coils 1163 and 1164 are energized in parallel to admit pressure and open exhaust.

Since contact adhesive is being used, it is imperative that the vertical edges of the panels align precisely and it is for this reason that the feet are employed because the panel being installed may be held by the vertical guide member 1081 of panel holding frame 81' squarely against the wall already formed as a result of holding over the lateral handle 1066 to maintain pressure thereagainst. It is at this time that the feet are lowered, and since they are independent of each other they align the panel holding frame relative to the floor to perfect the joint. Slight errors can be tolerated with respect to the floor because heavier or lighter amounts of adhesives may be employed, and in any event a floor molding will ultimately cover this joint.

To home the panel for its final connection, a delay of e.g. 2½ minutes is provided to allow the vapors to escape sufficiently so that the contact cement will set instantly upon contact. Then, it is only necessary to reverse switch 1160 (FIG. 35) to its position 17, energizing unit 1165 to admit pressure via solenoid valve 1162 over passage 1537 and simultaneously energize unit 1166 to exhaust the pressure from the opposite end of cylinder-piston 213' via solenoid valve 1161, and passage 1536 thereby completing the panel installation.

Before the complete operation is detailed, the following listing should insure complete understanding of the hydrostatic system. Looking at FIG. 36, the high pressure manifold 1510' receives the high pressure air over lead 1501, and in turn supplies high pressure air to the following leads: 1135', 1113, 1503, 1504, 1505, 1506, 1507, 1508, and 1509.

The exhaust manifold 1510 enables exhausting of the various components of the system via water trap 1101' to the atmosphere over the following exhaust leads: 1511, 1512, 1513, 1514, 1515, 1516, 1517, and 1518.

The leads which serve as either exhaust or high pressure leads depending upon whether the feet are being raised or lowered are leads 1114, 1114', 1117', 1125, 1139, and 1147.

The leads for supplying either high pressure or exhaust for operating the indexing double piston gripper 1022' are 1540, 1541, and 1542.

The leads for the regular gripping assemblies 111' and 113' are 127 and 149.

The liquid lines which are all bilateral are 1119, 1127, 1133, 1141, 1142, and 1143.

Finally, the vacuum leads are 1153 and 1154.

Looking now at FIG. 35, it will first be pointed out that no liquid lines or vacuum lines are visible in this figure.

The high pressure manifold 1103 distributes high pressure to the following leads 1505, 1526, 1527, 1528, 1529, 1530, 1531, and 1535.

The exhaust manifold 1103' exhausts the following leads: 1513, 1519, 1520, 1521, 1522, 1523, 1524, 1524', and 1525.

The leads which serve either as high pressure or exhaust leads comprise the following: 1193, 1196, 1536, and 1537.

Finally, the leads for the gripper assemblies 111' and 113' which serve for both pressure and exhaust are 127, 135, 135', and 149.

Figures 39, 40:
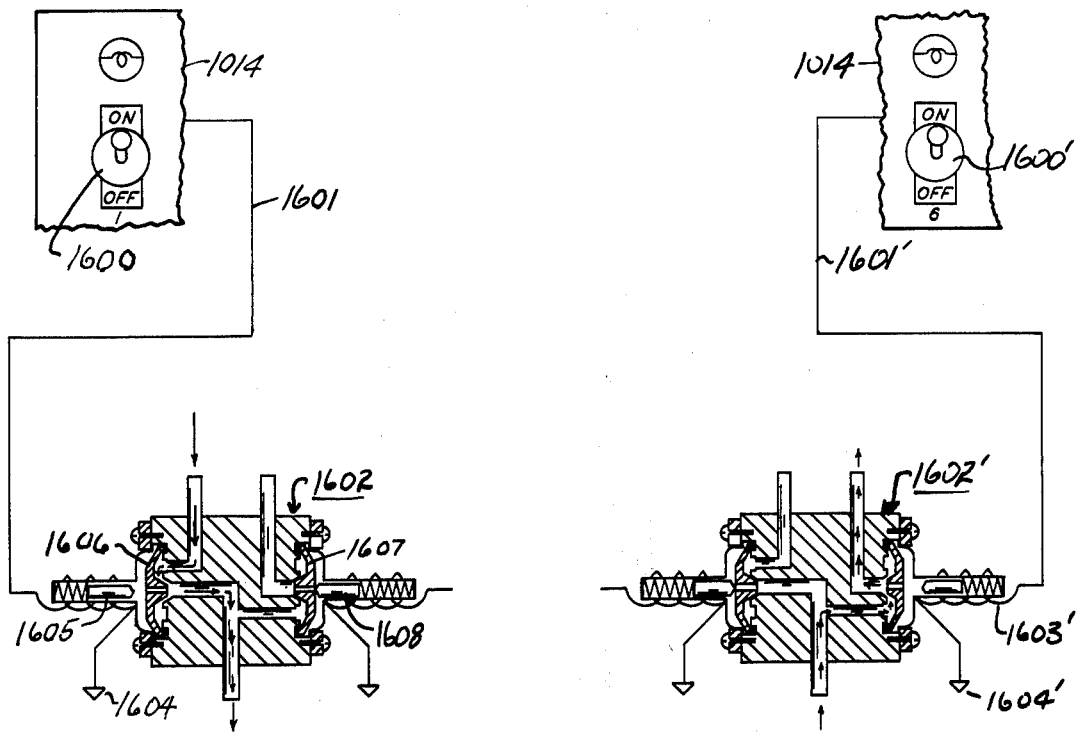
FIG. 39 is a schematic arrangement to show details of a valve effecting pressure passage operation.
FIG. 40 is a similar view of a valve effecting an exhaust operation.

FIGS. 39 and 40 show typical interconnections from control panel 1014 to typical solenoid valves 1602 and 1602'. One terminal of e.g. 110 volt AC is connected to the control board 1014 and is extended by way of switches 1600 and 1600' over leads 1601 and 1601' to solenoid units or coils 1603 and 1603'. These windings 1603 and 1603' are grounded or connected to the other terminal at 1604 and 1604' respectively. Energization of winding 1603, for example, moves pin 1605 away from rubber cup 1606 to open the normally closed valve. The other side of valve 1602 shows rubber cup 1607 closed because pin 1608 is against it.

Lights 1610 (FIG. 38) are white in the upper row to indicate their switches are in the upper position, and lights 1611 in the lower row are red to indicate lower active positions.

FIGS. 42 through 44 show an alternative structure for stabilizing the machine after it is indexed into position to insure that it homes the panel to the indexed position, maintaining rigid alignment during the panel draw back for the final bonded position and throughout the bonding procedures. The pivotal arm leveler stabilizer is generally shown at 1300. Pivotal arm 1301 is pivotally attached to the upstanding post at 1303, but rigidly connected to the cylinder or housing 1305. A foot pedal 1307, somewhat similar to foot pedal 1032, is pivotally connected to housing 1305 at 1309, at the forward end of both lateral arms 1311. The arms 1311 carry slots 1313 at a slight angle to the vertical pins 1315 rigidly fixed to the cylinder or housing 1305 extended through these slots to provide a camming action assisting in rigidly fixing the machine to the floor.

A foot 1317 slides within cylinder 1305 against the force of spring 1321. The central shaft 1323 is sliding foot 1317 passes out the upper end of cylinder 1305, enabling spring 1321 to be compressed as pressure is applied to the foot pedal 1307. The nut 1325 on shaft 1323 provides adjustment of the spring pressure.

An external spring 1327 is connected to a swivel adjusting link 1329, and these parts extend between foot pedal 1307 and cylinder 1305 to maintain foot pedal 1307 up as shown in FIG. 42.

The radius of pivot for foot pedal 1307 is considerably greater than the radius of curvature for foot 1317 so that the foot reaches the floor long before the foot pedal. Further pressure downwardly on the foot pedal causes foot 1317 to slide upwardly in cylinder 1305, until the spring pressure of 1321 increases to the point that it overcomes spring 1327 so that further pressure on foot pedal 1307 causes slot 1313 to cam pin 1315, thereby squeezing cylinder 1305 together because of the split 1335 in the cylinder wall. This locks the cylinder to foot 1317 so that the pair of feet 1317 and the foot pedal 1307 are all held rigidly against the floor to stabilize the machine. This stabilizer works on uneven floors also because the feet may assume different positions. Adjustment of swivel 1329 changes the relative spring pressures to control the degree of pressure necessary to lock the machine.

The following important functions and advantages are set forth concisely to insure thorough understanding of the invention.

The purpose of platform 1015 is to provide a base for wheels 1017 to separate and lift platform 1006 which lifts the panel frame holder 81' and panel, if present. It also serves as a base for left to right movement of wheels 1017. Wheels 1008 are on the floor because lift handle 1033 is only part way back, enough to raise pivot wheel 1010.

The purpose of cross bar 1069 is to permit lateral movement relative to platform 1015 which stays on the floor stationary because big wheels 1008 also remain stationary. The axle 1009 also remains stationary. Right-left lever 1066 is pinned to axle 1009.

The purpose of the upper portion of the stevedore, including platform 1006, is to move the panel frame holder 81' right and left and up and down.

Platform 1015 permits pivotal attachment thereto for locking the machine to the floor.

The lift handle 1033 lowers the pivot wheel 1010 and raises the rubber wheels 1008 or it can leave the rubber wheels 1008 and the front wheels 1016 on the floor by partial depression. It provides a lever for raising the large load and a guiding handle to wiggle or pivot the load.

The feet 1030 and 1031 urge the locking rods 145'' and 145''' tightly upwardly in their holes. Regardless of an uneven floor they still urge the panel upwardly. They also form a solid base when locked to hold the entire weight of the panel and panel frame holder 81', relieving the stevedore of any weight. They therefore are the base as to the weight of the panel for moving it upward and away and bonding it; but regardless of the weight not being on the stevedore, the foot pedal 1032 performs the locking function of preventing the machine from being oriented while the bonding operation is under way and this is due to the weight of the man on the foot pedal simply precluding right or left movement or front to back movement. The foot pedal mechanism actually tends to urge the stevedore up which in turn throws the upper roller 1080 forward for indexing against the adjacent panel surface and lifts the large wheels 1008 or at least removes weight from them but slight weight may be on the wheels 1016 at this time.

The indexing structure consists of the upper roller 1080 and lower grippers 141'.

If pivot wheel 1010 is on the floor, no lateral movement can take place since the large wheels 1008 are off the floor.

Also, a 200-pound load is readily lifted because of leverage advantages built in. The length of lift handle 1033 relative to the length of arm 1050 provides an advantage of approximately 3 to 1. Additional leverage advantage of 2 or 3 to 1 is also obtained because of the length of arm 1056 between the holes 1056' and 1057' relative to the length from hole 1057' to the position of cam wheel 1051 on roller plate 1055.

Operation of the machine will now be explained to show the picking up of a panel and installation of the panel to a fixed position or wall. Referring to the control panel 1014 of FIG. 38, the operator first switches switch 111 to position 14 and switch 1122 to position 15 to raise the feet 1030 and 1031 as previously explained. This permits sufficient clearance for moving the stevedore carrier without damage to the feet or vacuum cups. Lift handle 1033 of the stevedore is depressed slightly in order to place the stevedore on the small wheels 1016 including pivot wheel 1010 for orienting the stevedore carrier equipped with the panel handling apparatus.

The panels are usually stored vertically and switch 17 is switched to position 17A to elevate the panel holding frame 81'. Since the lift handle 1033 is depressed, the cylinder-piston 93' with its plunger 83' and the sensing switch 1082 will ride over the top of a panel to be gripped. Then, the lift handle 1033 is returned to a forward position.

If necessary the operator may move lateral handle 1066 in the proper direction to cause the panel to abut against vertical guide 1081 of frame 81'.

Switch 1160 is next returned to position 17 in order that the sensing switch 1082 will be in position to sense the top of the panel. The lift handle 1033 can be oscillated slightly to sense the top of the panel with sensing switch 1082 which the operator recognizes because the control panel lights change from red light 1084 to white light 1085, at which time the operator turns switch 1170 from position 7 to its on position to apply high pressure to the bore 127 of the double piston-cylinders 111' and 113', the details of which are shown precisely in FIGS. 14 through 17, as previously explained. This is effected by solenoid valve 1171 (FIG. 35), by energizing its pressure coil 1172 for the simultaneous connection of passage ways to piston cylinders 111' and 113'. About the same time the operator also turns exhaust switch 1174 from position 12 to its on position, which energizes coil 1175 of valve solenoid 1176 (FIG. 35) to exhaust port 135 (FIG. 14). The hollow shaft or pin 87 of FIG. 14 (corresponding to pins or grippers 145'' and 145''' of FIG. 35) are extended through the panel.

Next, the operator switches switch 1180 from off position 9 to its on position and switch 1181 from off position 8 to on position to energize inlet valve 1182 over its winding 1183 (FIG. 35) thereby extending high pressure to coupling 149 (FIG. 16). Switch 1181 energizes coil 1184 of valve solenoid 1171 to exhaust connected to bore 127 (FIG. 16). This spreads the grippers 141 and 143 of FIG. 16. Next, the operator switches switch 1180, namely pressure switch 11, to the on position to energize valve solenoid 1176 on its pressure coil 1182 which applies pressure to coupling 135 (FIG. 17) to urge the piston 121 to the right, permitted by energizing switch 1185 from position 10 to its on position to exhaust at coupling 149 of FIG. 17 by energizing coil 1186 of solenoid valve 1182 of FIG. 35. The panel is now securely locked to the panel holding frame by the bottom two double piston cylinders.

Next, the upper piston cylinder 93' is energized to cause plunger 83' to enter the panel from the top. This is accomplished by pushing switch 1190 from position 13 to position 13A which energizes coil 1191 of valve solenoid 1192 to pressure one end of piston cylinder 193' at its upper coupling 1193. Simultaneously the cylinder is exhausted because of parallel electrical connections which energize exhaust coil 1194 of valve solenoid 1195 connected to coupling 1196 of piston cylinder 93'. Now the panel is gripped and ready for movement to the bonding location.

Next, the lift handle 1033 is pulled back to place the carrier on all little wheels for transporting the heavy load, also, enabling pivotal movement of the load as it is pushed along on the load bearing wheels to permit "wiggling" of the load into adjacent position to the wall being constructed.

Now, the lift handle 1033 is elevated which lets the panel go to the floor, raises the pivot wheel and places the load on the big wheels and the load bearing wheels 1016. Now, if desirable, the lateral lever 1066 may be moved to shift the panel to the right or left adjacent to the wall being constructed. Manipulation of lift handle 1033 enables wight lifting of the panel for slidable contact with the floor and easier manipulation of lateral lever 1066 to work the panel into the best possible contact with the adjacent panel to be affixed to.

Once the panel has been fitted to its homing position, the indexing double piston cylinder 145' (FIG. 33) again corresponding to the structure and functions described in connection with FIGS. 14 through 16, is actuated to latch the directional carriage 251' to the existing building construction or panel wall.

Looking now at FIG. 38, the operator first energizes pressure switch 1, shown at 1200, and exhaust switch 6, shown at 1201, which energizes pressure coil 1203 of solenoid valve 1204 (FIG. 35) and simultaneously energizes exhaust winding 1205 of solenoid valve 1206 to engage the panel by the hollow shaft of double piston cylinder 145'. These switches are now turned off. Next, to extend the grippers, pressure switch 3, as shown at 1207, is thrown to its on position, along with pressure exhaust switch 2, shown at 1208, to energize pressure coil 1209 (FIG. 35) of solenoid valve 1210 and exhaust coil 1211 of solenoid valve 1204. These two switches are then turned off, and the operator next energizes switch 1211 from pressure position 5 to on and 1213 from exhaust position 4 to on to energize coil 1215 of solenoid valve 1206, and coil 1216 of solenoid valve 1210, thereby securing the indexing structure in the wall.

When the panel is attached to the machine, the adhesive is usually applied to the floor and adjacent panel in readiness for the new panel to be brought over into position.

Now the operator switches switch 1111 from position 14 to position 14A to lower the feet 1030 and 1031. The lowering of the feet will not raise the panel because of the pressure adjustment heretofore mentioned or as the pressure is insufficient to raise the loaded equipment. Now the operator locks the feet position by moving switch 1122 from its 15 position to its 15A position. Then the operator turns switch 1150 on to its position 16A to supply suction to vacuum cups 1021 and 1022 thereby adhering them to the floor. This switch is not turned off but rather left in its energized position like the locking switch to maintain the status quo.

Now switch 1160 is moved from position 17 to position 17A to lift the unattached panel, at the approximately 45° angle away from its homing position. The panel is held in its displaced position for a period of 2 or 2½ minutes, depending upon the commercial adhesive used, in order to allow the same to vaporize to the manufacture's specification. Then switch 1160 is switched from position 17A to position 17 to home the panel for final adhesive locking.

Then the locking system is reversed to free the stevedore carrier from the fixed panel which it just located in order that the operator may use it to pick up another panel for further building construction.

We claim:
1. Construction panel handling apparatus adapted to orient and locate a single panel to be assembled to other panels relative to one or more of the other panels by gripping the single panel via apertures located in precise predetermined positions and moving the single panel comprising, in combination panel frame holder means including means for gripping the single panel through engagement with said apertures rigidly to fix it to the panel frame holder means; supporting frame means for holding the panel frame holder means and said single panel in a spaced position from the panel or panels to which the single panel is to be connected; directional means carried by the supporting frame means for reciprocally moving the panel frame holder means and said single panel toward and away from the panel or panels to be joined along a path out of the normal to any edges to be contacted by the single panel being moved; said directional means comprising track means and track receiving means; one of said track means and track receiving means supported by the supporting frame means and the other of said track means and track receiving means carried by the panel frame holder means; said track means defining said path; and means for orienting said directional means to align the single panel to the other panels by orienting said track.

2. The construction panel handling apparatus of claim 1 wherein said supporting frame means comprises a base adapted to be fixed against movement; and means pivotal relative to the base for moving the panel frame holder means from one plane into a plane orthogonal thereto.

3. The construction panel handling apparatus of claim 1 wherein said means for gripping the single panel comprises pins, and means for reciprocating the pins relative to the panel frame holder and single panel.

4. The construction panel handling apparatus of claim 1 wherein said means for gripping the single panel comprises reciprocating means carried by the panel frame holder means at spaced apart positions and oriented in planes at right angles to each other and adapted for reciprocating motion in their respective planes.

5. The construction panel handling apparatus of claim 1 wherein the means for moving the panel frame holder means comprises a cylinder-piston means supported by the supporting frame means; and said piston means being connected to the panel frame holder means.

6. The construction panel handling apparatus for assembling a single panel to one or more panels comprising, in combination means for releasably gripping the single panel; means for moving the single panel up and down along its longitudinal axis relative to said one or more panels; means for moving the panel right and left at substantially right angles to the direction of up and down movement generally along its axis 90° to the longitudinal axis in the plane of the single panel; means for tilting the panel clockwise or counterclockwise of the direction of up and down movement in the plane of said axes; means for tilting the panel forwardly or rearwardly of the direction of up and down movement in a direction generally orthogonally of said axes; means for reciprocally moving the gripping means along a predetermined path to contact the single panel against said one or more panels; and support means for the means for moving.

7. The apparatus of claim 6 wherein the support means comprises holding means securing the support means to said one or more panels.

8. The apparatus of claim 7 wherein the holding means comprises vacuum cups.

9. The apparatus of claim 6 comprising pivotal means connecting the moving means to the support means.

10. The apparatus of claim 6 wherein the support means comprise base securing means, an orientable base, and means between the base securing means and the orientable base universally to move the orientable base and lock it relative to the base securing means.

11. The apparatus of claim 10 wherein means between comprise a plurality of pistons and piston shafts supporting the orientable base, and valve means controlling the pistons.

12. Indexing panel installer for constructing walls and the like by indexing pre-fabricated panel sections in proper orientation one to the other and relative to the floor or foundation, comprising in combination frame means having a flat platform area; axle and wheel means connected to the frame means; further frame means supported from the axle means and pivotally mounted relative to the first mentioned frame means; pivot wheel means connected to the further frame means; means for pivoting the further frame means relative to the first mentioned frame means to raise the wheel means and lower the pivot wheel means; panel frame holder means carried by the further means and adapted to receive and grip a panel; means for guiding and moving the panel frame holder means relative to the further means, following a predetermined path whereby a panel being assembled to another panel contacts the edge of said another panel simultaneously with a floor or foundation for said another panel.

13. Indexing panel installer of claim 12 wherein said means for pivoting the further frame means relative to said frame means comprises remotely controlled means for supporting said further frame means from the platform area of said frame means.

14. The indexing panel installer of claim 13 further comprising means for locking the indexing panel installer to the floor or foundation for insuring that the predetermined path is maintained fixed relative to the floor and said another panel.

15. The indexing panel installer of claim 14 further comprising means for moving the further frame means laterally relative to said frame means.

16. Indexing panel installer of claim 15 further comprising remotely controlled feet for said panel frame holder means to carry the weight of the panel frame holder means and any panel gripped thereby.

17. Indexing panel installer of claim 16 further comprising vacuum suction means remotely controlled to lock the panel frame holder means to the floor or foundation.

18. Indexing panel installer of claim 17 further comprising remotely controlled means for locking the feet in an indexing position relative to an even or uneven floor to orient the predetermined path relative to the floor of said another panel.

19. Apparatus for picking up, transporting and lifting panel loads comprising in combination:
a frame;
panel frame holder means carried by the frame;
panel holder means for gripping the panel;
means for reciprocally moving the panel frame holder means along a predetermined track relative to the panel holder means;
a platform for the frame;
load supporting wheels connected to the platform;
axle means connected to the platform;
further wheels of a different diameter than the load supporting wheels connected to the axle means;
lateral means slideable along the axle means for carrying the frame; and
camming means for moving the frame away from and toward at least one end of the platform to raise and lower the panel frame holder means.

20. The apparatus of claim 19 wherein said camming means comprise a pivot wheel adapted to be lowered to cooperate with the load supporting wheels in lessening and removing any load weight from the load supporting wheels.

21. The apparatus of claim 20 further comprising a lateral lever connected to the axle means to move the frame in directions longitudinally of the axle means by shifting the lateral means.

22. The apparatus of claim 21 further comprising locking means pivotally mounted to the platform for depression rearwardly of the platform to urge upwardly against the load thereby locking the apparatus against movement.

23. The apparatus of claim 19 further comprising panel load gripping means carried by the panel holder means for gripping the panel load to move it along the predetermined track; and indexing gripping means carried by the panel frame holder means.

24. The apparatus of claim 19 further comprising movable feet carried by the panel frame holder means for urging the panel frame holder means upwardly when lowered.

25. The apparatus of claim 24 further comprising vacuum cups surrounding said feet for locking the panel frame holder means to the floor when suction is applied thereto.

26. Apparatus for handling panel loads comprising in combination:
   means for gripping a panel load;
   means for reciprocating the panel load gripping means along a predetermined path;
   means for moving the reciprocating means vertically up and down;
   means for transporting said panel load and said means;
   said means for transporting comprising load bearing wheels;
   a pivot wheel carried by the means for moving the reciprocating means vertically up and down whereby the pivot wheel becomes load bearing when the means for moving the reciprocating means moves the reciprocating means down;
   further means for moving at least said panel load in directions normal to the vertical; and
   said predetermined path lying intermediate the vertical and said directions normal to the vertical.

27. The apparatus of claim 26 wherein the transporting means further comprises wheels of larger diameter than said load bearing wheels carried by the means for moving the reciprocating means vertically up and down in spaced relation to the pivot wheel to become load bearing when the pivot wheel ceases to be load bearing.

28. The apparatus of claim 27 further comprising camming means connecting the pivot wheel to the means for moving the reciprocating means vertically up and down whereby the further wheels of larger diameter are elevated when the pivot wheel is pressed downwardly after a predetermined movement of the pivot wheel.

29. The apparatus of claim 28 wherein said camming means comprise mechanical leverage means facilitating the vertically up movement of the means for moving the reciprocating means.

30. The apparatus of claim 6 wherein the predetermined path is an approximately 45° path between the single panel and at least said one panel whereby an edge of said single panel is caused to align and abut with an edge of at least said one panel through movement of the single panel along said path.

31. The construction panel handling apparatus for assembling a single panel to an edge of another panel and the floor simultaneously comprising in combination: means for releasably gripping the single panel; means for moving the releasable gripping means up and down to move the single panel vertically relative to said another panel and floor to locate the single panel vertically adjacent the another panel and the floor; means for moving the releasable gripping means toward and away from said another panel edge to locate the single panel horizontally adjacent said another panel; means for tilting the releasable gripping means in the direction of said edge and away from said edge to compensate for vertical misalignment in the plane of said another panel; means for tilting the releasable means back and forth out of the plane of said another panel to compensate for vertical misalignment generally normal to said aforementioned vertical misalignment; means for establishing a path for said releasable means at an angle of substantially 45° to said edge and floor; means for reciprocally moving the gripping means back along said path to permit glue to be applied for said assembly and forth along said path to contact the single panel against said edge and floor simultaneously and transport support means for all said means for moving.

* * * * *